United States Patent
Raley et al.

(10) Patent No.: US 9,626,668 B2
(45) Date of Patent: Apr. 18, 2017

(54) RIGHTS EXPRESSION PROFILE SYSTEM AND METHOD USING TEMPLATES

(75) Inventors: Michael C. Raley, Highland, CA (US);
Charles P. Gilliam, Raleigh, NC (US);
Manual Ham, Downey, CA (US);
Guillermo Lao, Torrance, CA (US);
Bijan Tadayon, Potomac, MD (US)

(73) Assignee: CONTENTGAURD HOLDINGS, INC., Wilmington, DE (US)

( * ) Notice: Subject to any disclaimer, the term of this patent is extended or adjusted under 35 U.S.C. 154(b) by 765 days.

(21) Appl. No.: 12/204,393

(22) Filed: Sep. 4, 2008

(65) Prior Publication Data
US 2008/0320599 A1    Dec. 25, 2008

Related U.S. Application Data

(63) Continuation of application No. 10/388,162, filed on Mar. 14, 2003.
(Continued)

(51) Int. Cl.
*G06F 21/00* (2013.01)
*G06Q 20/12* (2012.01)
(Continued)

(52) U.S. Cl.
CPC ......... *G06Q 20/1235* (2013.01); *G06F 21/10* (2013.01); *G06Q 40/00* (2013.01);
(Continued)

(58) Field of Classification Search
CPC . G06Q 20/1235; H04N 21/2541; G06F 21/10
(Continued)

(56) References Cited

U.S. PATENT DOCUMENTS

| | | |
|---|---|---|
| 4,159,468 A | 6/1979 | Barnes et al. |
| 4,200,700 A | 4/1980 | Mäder |

(Continued)

FOREIGN PATENT DOCUMENTS

| | | |
|---|---|---|
| BR | 9810967 A | 10/2001 |
| EP | 0 067 556 B1 | 12/1982 |

(Continued)

OTHER PUBLICATIONS

Blaze et al, "Divertible Protocols and Atomic Proxy Cryptography" 1998 Advances in Cryptography 13 Euro Crypt International Conference on the Theory and Application of Crypto Techniques, Springer Verlag, DE.
(Continued)

*Primary Examiner* — Steven Kim
(74) *Attorney, Agent, or Firm* — Rimon PC; Marc Kaufman

(57) ABSTRACT

A system and method for creating a rights expression for association with an item for use in a system for controlling use of the item in accordance with the rights expression, including specifying rights expression information indicating a manner of use of an item, the rights expression information including at least one element, the element having a variable and corresponding value for the variable; and performing an encoding process, including determining an identifier associated with a template corresponding to the rights expression information, extracting from the rights expression information the value for the variable corresponding to the element, and encoding a license adapted to be enforced on a device based on the variable and the identifier, the license including an identification of the template and the value for the variable.

21 Claims, 8 Drawing Sheets

Related U.S. Application Data

(60) Provisional application No. 60/363,932, filed on Mar. 14, 2002.

(51) Int. Cl.

| | | |
|---|---|---|
| *G06F 21/10* | (2013.01) | |
| *G06Q 40/00* | (2012.01) | |
| *H04N 21/254* | (2011.01) | |
| *H04N 21/835* | (2011.01) | |
| *H04N 21/8355* | (2011.01) | |

(52) U.S. Cl.
CPC ....... *H04N 21/2541* (2013.01); *H04N 21/835* (2013.01); *H04N 21/83555* (2013.01); *G06F 2221/0766* (2013.01)

(58) Field of Classification Search
USPC ....................................................... 705/50–59
See application file for complete search history.

(56) References Cited

U.S. PATENT DOCUMENTS

| | | | |
|---|---|---|---|
| 4,278,837 A | 7/1981 | Best | |
| 4,361,851 A | 11/1982 | Asip et al. | |
| 4,423,287 A | 12/1983 | Zeidler | |
| 4,429,385 A | 1/1984 | Cichelli et al. | |
| 4,621,321 A | 11/1986 | Boebert et al. | |
| 4,658,093 A | 4/1987 | Hellman | |
| 4,736,422 A | 4/1988 | Mason | |
| 4,740,890 A | 4/1988 | William | |
| 4,796,220 A | 1/1989 | Wolfe | |
| 4,816,655 A | 3/1989 | Musyck et al. | |
| 4,888,638 A | 12/1989 | Bohn | |
| 4,937,863 A | 6/1990 | Robert et al. | |
| 4,953,209 A | 8/1990 | Ryder et al. | |
| 4,977,594 A | 12/1990 | Shear | |
| 5,014,234 A | 5/1991 | Edwards | |
| 5,091,966 A | 2/1992 | Bloomberg et al. | |
| 5,109,413 A | 4/1992 | Comerford et al. | |
| 5,128,525 A | 7/1992 | Stearns et al. | |
| 5,129,083 A | 7/1992 | Cutler et al. | |
| 5,138,712 A | 8/1992 | Corbin | |
| 5,168,147 A | 12/1992 | Bloomberg | |
| 5,174,641 A | 12/1992 | Lim | |
| 5,204,897 A | 4/1993 | Wyman | |
| 5,221,833 A | 6/1993 | Hecht | |
| 5,245,165 A | 9/1993 | Zhang | |
| 5,247,575 A | 9/1993 | Sprague et al. | |
| 5,260,999 A | 11/1993 | Wyman | |
| 5,276,444 A | 1/1994 | McNair | |
| 5,287,408 A | 2/1994 | Samson | |
| 5,291,596 A | 3/1994 | Mita | |
| 5,293,422 A | 3/1994 | Loiacono | |
| 5,335,275 A | 8/1994 | Millar et al. | |
| 5,337,357 A | 8/1994 | Chou et al. | |
| 5,386,369 A | 1/1995 | Christiano | |
| 5,390,297 A | 2/1995 | Barber et al. | |
| 5,412,717 A | 5/1995 | Fischer | |
| 5,414,852 A | 5/1995 | Kramer et al. | |
| 5,438,508 A | 8/1995 | Wyman | |
| 5,444,779 A | 8/1995 | Daniele | |
| 5,449,895 A | 9/1995 | Hecht et al. | |
| 5,449,896 A | 9/1995 | Hecht et al. | |
| 5,453,601 A | 9/1995 | Rosen | |
| 5,453,605 A | 9/1995 | Hecht et al. | |
| 5,477,263 A | 12/1995 | O'Callaghan et al. | |
| 5,485,577 A | 1/1996 | Eyer et al. | |
| 5,504,816 A | 4/1996 | Hamilton et al. | |
| 5,521,372 A | 5/1996 | Hecht et al. | |
| 5,530,235 A | 6/1996 | Stefik et al. | |
| 5,535,276 A | 7/1996 | Ganesan | |
| 5,553,143 A | 9/1996 | Ross et al. | |
| 5,557,518 A | 9/1996 | Rosen | |
| 5,557,678 A | 9/1996 | Ganesan | |
| 5,564,038 A | 10/1996 | Grantz et al. | |
| 5,576,532 A | 11/1996 | Hecht | |
| 5,619,570 A | 4/1997 | Tsutsui | |
| 5,625,690 A | 4/1997 | Michel et al. | |
| 5,629,980 A | 5/1997 | Stefik et al. | |
| 5,634,012 A | 5/1997 | Stefik et al. | |
| 5,636,346 A | 6/1997 | Saxe | |
| 5,638,443 A | 6/1997 | Stefik et al. | |
| 5,638,513 A | 6/1997 | Ananda | |
| 5,640,592 A * | 6/1997 | Rao | 710/5 |
| 5,673,316 A | 9/1997 | Auerbach et al. | |
| 5,684,885 A | 11/1997 | Cass et al. | |
| 5,708,709 A | 1/1998 | Rose | |
| 5,715,403 A | 2/1998 | Stefik | |
| 5,717,604 A | 2/1998 | Wiggins | |
| 5,745,879 A | 4/1998 | Wyman | |
| 5,764,807 A | 6/1998 | Pearlman et al. | |
| 5,765,152 A | 6/1998 | Erickson | |
| 5,787,172 A | 7/1998 | Arnold | |
| 5,790,677 A | 8/1998 | Fox et al. | |
| 5,812,664 A | 9/1998 | Bernobich et al. | |
| 5,825,876 A | 10/1998 | Peterson | |
| 5,825,879 A | 10/1998 | Davis | |
| 5,838,792 A | 11/1998 | Ganesan | |
| 5,848,154 A | 12/1998 | Nishio et al. | |
| 5,848,378 A | 12/1998 | Shelton et al. | |
| 5,850,433 A | 12/1998 | Rondeau | |
| 5,864,127 A | 1/1999 | Jackson et al. | |
| 5,892,900 A * | 4/1999 | Ginter et al. | 726/26 |
| 5,915,019 A | 6/1999 | Ginter et al. | |
| 5,917,912 A | 6/1999 | Ginter et al. | |
| 5,933,498 A | 8/1999 | Schneck et al. | |
| 5,940,504 A | 8/1999 | Griswold | |
| 5,982,891 A | 11/1999 | Ginter et al. | |
| 5,987,134 A | 11/1999 | Shin et al. | |
| 5,999,624 A | 12/1999 | Hopkins | |
| 6,000,613 A | 12/1999 | Hecht et al. | |
| 6,006,332 A | 12/1999 | Rabne et al. | |
| 6,020,882 A | 2/2000 | Kinghorn et al. | |
| 6,044,466 A | 3/2000 | Anand et al. | |
| 6,047,067 A | 4/2000 | Rosen | |
| 6,073,234 A | 6/2000 | Kigo et al. | |
| 6,076,738 A | 6/2000 | Bloomberg et al. | |
| 6,091,777 A | 7/2000 | Guetz et al. | |
| 6,112,239 A | 8/2000 | Kenner et al. | |
| 6,135,646 A | 10/2000 | Kahn et al. | |
| 6,138,119 A * | 10/2000 | Hall et al. | 707/9 |
| 6,141,754 A | 10/2000 | Choy | |
| 6,157,719 A | 12/2000 | Wasilewski et al. | |
| 6,169,976 B1 | 1/2001 | Colosso | |
| 6,182,901 B1 | 2/2001 | Hecht et al. | |
| 6,185,683 B1 | 2/2001 | Ginter et al. | |
| 6,189,037 B1 | 2/2001 | Adams et al. | |
| 6,189,146 B1 | 2/2001 | Misra et al. | |
| 6,208,771 B1 | 3/2001 | Jared et al. | |
| 6,209,092 B1 | 3/2001 | Linnartz | |
| 6,216,112 B1 | 4/2001 | Fuller et al. | |
| 6,219,652 B1 | 4/2001 | Carter et al. | |
| 6,226,618 B1 | 5/2001 | Downs et al. | |
| 6,233,684 B1 | 5/2001 | Stefik et al. | |
| 6,236,971 B1 | 5/2001 | Stefik et al. | |
| 6,253,193 B1 | 6/2001 | Ginter et al. | |
| 6,307,939 B1 | 10/2001 | Vigarie | |
| 6,311,214 B1 | 10/2001 | Rhoads | |
| 6,327,652 B1 | 12/2001 | England et al. | |
| 6,353,888 B1 | 3/2002 | Kakehi et al. | |
| 6,363,488 B1 | 3/2002 | Ginter et al. | |
| 6,389,538 B1 | 5/2002 | Gruse et al. | |
| 6,397,333 B1 | 5/2002 | Söhne et al. | |
| 6,401,211 B1 | 6/2002 | Brezak, Jr. et al. | |
| 6,405,369 B1 | 6/2002 | Tsuria | |
| 6,424,717 B1 | 7/2002 | Pinder et al. | |
| 6,424,947 B1 | 7/2002 | Tsuria et al. | |
| 6,487,659 B1 | 11/2002 | Kigo et al. | |
| 6,516,052 B2 | 2/2003 | Voudouris | |
| 6,516,413 B1 | 2/2003 | Aratani et al. | |
| 6,523,745 B1 | 2/2003 | Tamori | |
| 6,536,037 B1 * | 3/2003 | Guheen et al. | 717/151 |
| 6,708,157 B2 | 3/2004 | Stefik et al. | |

(56) References Cited

U.S. PATENT DOCUMENTS

| | | | |
|---|---|---|---|
| 6,796,555 B1 | 9/2004 | Blahut | |
| 6,912,294 B2 | 6/2005 | Wang et al. | |
| 6,920,567 B1 | 7/2005 | Doherty et al. | |
| 6,944,776 B1* | 9/2005 | Lockhart et al. | 713/176 |
| 6,963,859 B2 | 11/2005 | Stefik et al. | |
| 7,028,127 B2* | 4/2006 | Kang et al. | 710/303 |
| 7,062,500 B1* | 6/2006 | Hall et al. | 707/102 |
| 7,225,160 B2 | 5/2007 | Stefik et al. | |
| 7,269,576 B2 | 9/2007 | Stefik et al. | |
| 7,424,034 B2* | 9/2008 | Kawaguchi et al. | 370/466 |
| 7,523,072 B2 | 4/2009 | Stefik et al. | |
| 7,774,280 B2 | 8/2010 | Nguyen et al. | |
| 8,001,053 B2 | 8/2011 | Nguyen et al. | |
| 8,001,054 B1 | 8/2011 | Peart et al. | |
| 8,108,313 B2* | 1/2012 | Raley et al. | 705/59 |
| 8,370,956 B2 | 2/2013 | Stefik et al. | |
| 8,393,007 B2 | 3/2013 | Stefik et al. | |
| 2001/0009026 A1 | 7/2001 | Terao et al. | |
| 2001/0011276 A1 | 8/2001 | Durst, Jr. et al. | |
| 2001/0014206 A1 | 8/2001 | Artigalas et al. | |
| 2001/0037467 A1 | 11/2001 | O'Toole, Jr. et al. | |
| 2001/0039659 A1 | 11/2001 | Simmons et al. | |
| 2002/0001387 A1 | 1/2002 | Dillon | |
| 2002/0035618 A1 | 3/2002 | Mendez et al. | |
| 2002/0044658 A1 | 4/2002 | Wasilewski et al. | |
| 2002/0056118 A1 | 5/2002 | Hunter et al. | |
| 2002/0069282 A1 | 6/2002 | Reisman | |
| 2002/0077984 A1 | 6/2002 | Ireton | |
| 2002/0099948 A1 | 7/2002 | Kocher et al. | |
| 2002/0127423 A1 | 9/2002 | Kayanakis | |
| 2002/0152173 A1 | 10/2002 | Rudd | |
| 2002/0157002 A1* | 10/2002 | Messerges et al. | 713/155 |
| 2003/0046274 A1* | 3/2003 | Erickson et al. | 707/3 |
| 2003/0097567 A1 | 5/2003 | Terao et al. | |
| 2003/0126086 A1* | 7/2003 | Safadi | 705/51 |
| 2003/0144869 A1 | 7/2003 | Fung et al. | |
| 2003/0163684 A1 | 8/2003 | Fransdonk | |
| 2003/0182142 A1 | 9/2003 | Valenzuela et al. | |
| 2004/0052370 A1 | 3/2004 | Katznelson | |
| 2004/0172552 A1 | 9/2004 | Boyles et al. | |
| 2004/0230529 A1 | 11/2004 | Tieu et al. | |
| 2005/0004875 A1 | 1/2005 | Kontio et al. | |

FOREIGN PATENT DOCUMENTS

| | | |
|---|---|---|
| EP | 0 257 585 A2 | 3/1988 |
| EP | 0 262 025 | 3/1988 |
| EP | 0268139 A2 | 5/1988 |
| EP | 0 332 304 A2 | 9/1989 |
| EP | 0 393 806 A2 | 10/1990 |
| EP | 0 450 841 A2 | 10/1991 |
| EP | 0 529 261 A2 | 3/1993 |
| EP | 0567800 A1 | 11/1993 |
| EP | 0 613 073 A1 | 8/1994 |
| EP | 0 678 836 A1 | 10/1995 |
| EP | 0 679 977 A1 | 11/1995 |
| EP | 0 715 243 A1 | 6/1996 |
| EP | 0 715 244 A1 | 6/1996 |
| EP | 0 715 245 A1 | 6/1996 |
| EP | 0 731 404 A1 | 9/1996 |
| EP | 0 763 936 A2 | 3/1997 |
| EP | 0 818 748 A2 | 1/1998 |
| EP | 0 840 194 A2 | 5/1998 |
| EP | 0 892 521 A2 | 1/1999 |
| EP | 0 934 765 A1 | 8/1999 |
| EP | 0 946 022 A2 | 9/1999 |
| EP | 0 964 572 A1 | 12/1999 |
| EP | 1 103 922 A | 5/2001 |
| GB | 1483282 | 8/1977 |
| GB | 2022969 A | 12/1979 |
| GB | 2236604 A | 4/1991 |
| GB | 2309364 A | 7/1997 |
| GB | 2316503 A | 2/1998 |
| GB | 2354102 A | 3/2001 |
| JP | 3-063717 | 3/1991 |
| JP | H4-180451 | 6/1992 |
| JP | 5-100939 | 4/1993 |
| JP | 5168039 A2 | 7/1993 |
| JP | 6-131371 | 5/1994 |
| JP | 7-36768 | 2/1995 |
| JP | 11031130 A2 | 2/1999 |
| JP | 11032037 A2 | 2/1999 |
| JP | 11205306 A2 | 7/1999 |
| JP | 11215121 A2 | 8/1999 |
| JP | 2000215165 A2 | 8/2000 |
| JP | 2001-294557 | 4/2003 |
| JP | 2005218143 A2 | 8/2005 |
| JP | 2005253109 A2 | 9/2005 |
| JP | 2006180562 A2 | 7/2006 |
| WO | WO 83/04461 A1 | 12/1983 |
| WO | WO 92/20022 A1 | 11/1992 |
| WO | WO 93/01550 A1 | 1/1993 |
| WO | WO 93/11480 A1 | 6/1993 |
| WO | WO 94/03003 A1 | 2/1994 |
| WO | WO 96/13814 A1 | 5/1996 |
| WO | WO 96/24092 A2 | 8/1996 |
| WO | WO 96/27155 A2 | 9/1996 |
| WO | WO 97/25800 A1 | 7/1997 |
| WO | WO 97/37492 A1 | 10/1997 |
| WO | WO 97/41661 A2 | 11/1997 |
| WO | WO 97/43761 A2 | 11/1997 |
| WO | WO 98/09209 A1 | 3/1998 |
| WO | WO 98/10561 A1 | 3/1998 |
| WO | WO 98/11690 A1 | 3/1998 |
| WO | WO 98/19431 A1 | 5/1998 |
| WO | WO 98/43426 A1 | 10/1998 |
| WO | WO 98/45768 A1 | 10/1998 |
| WO | WO 99/24928 A2 | 5/1999 |
| WO | WO 99/34553 A1 | 7/1999 |
| WO | WO 99/35782 A1 | 7/1999 |
| WO | WO 99/48296 A1 | 9/1999 |
| WO | WO 99/60461 A1 | 11/1999 |
| WO | WO 99/60750 A2 | 11/1999 |
| WO | WO 00/04727 A2 | 1/2000 |
| WO | WO 00/05898 A2 | 2/2000 |
| WO | WO 00/46994 A1 | 8/2000 |
| WO | WO 00/59152 A2 | 10/2000 |
| WO | WO 00/62260 A1 | 10/2000 |
| WO | WO 00/72118 A1 | 11/2000 |
| WO | WO 00/73922 A2 | 12/2000 |
| WO | WO 01/03044 A1 | 1/2001 |
| WO | WO 01/37209 A1 | 5/2001 |
| WO | WO 2004/034223 A2 | 4/2004 |
| WO | WO 2004/103843 | 12/2004 |

OTHER PUBLICATIONS

Blaze et al, "Atomic Proxy Cryptography" Draft (Online) (Nov. 2, 1997) XP002239619 Retrieved from the Internet.

No Author, "Capability- and Object-Based Systems Concepts," Capability-Based Computer Systems, pp. 1-19 (no date).

Cox, "Superdistribution" Wired Magazine (Sep. 1994) XP002233405 URL:http://www.wired.com/archive/2.09/sperdis_pt.html>.

Dunlop et al, Telecommunications Engineering, pp. 346-352 (1984).

Elgamal, "A Public Key Cryptosystem and a Signature Scheme Based on Discrete Logarithms," IEEE Transactions on Information Theory IT-31(4):469-472 (Jul. 1985).

Gheorghiu et al., "Authorization for Metacomputing Applications" (no date).

Iannella, ed., Open Digital Rights Language (ODRL), pp. 1-31 (Nov. 21, 2000).

Kahle, wais.concepts.txt, Wide Area Information Server Concepts, Thinking Machines Version 4, Draft, pp. 1-18 (Nov. 3, 1989).

Kahn, "Deposit, Registration and Recordation in an Electronic Copyright Management System," Technical Report, Corporation for National Research Initiatives, Reston, Virginia (Aug. 1992) URL:http://www.cni.org/docs/ima.ip-workshop/kahn.html.

Kahn et al, "The Digital Library Project, vol. 1: The World of Knowbots (Draft), An Open Architecture for a Digital Library

(56) References Cited

OTHER PUBLICATIONS

System and a Plan for its Development," Corporation for National Research Initiatives, pp. 1-48 (Mar. 1988).
Kohl et al, Network Working Group Request for Comments: 1510, pp. 1-112 (Sep. 1993).
Lee et al, CDMA Systems Engineering Handbook (1998) [excerpts but not all pages numbered].
Mambo et al, "Protection of Data and Delegated Keys in Digital Distribution," Information Security and Privacy. Second Australian Conference, ACISP '97 Proceedings, pp. 271-282 (Sydney, NSW, Australia, Jul. 7-9, 1997, 1997 Berlin, Germany, Springer-Verlag, Germany), XP008016393 ISBN: 3-540-63232-8.
Mambo et al, "Proxy Cryptosystems: Delegation of the Power to Decrypt Ciphertexts,", IEICE Trans. Fundamentals vol. E80-A, No. 1:54-63 (Jan. 1997) XP00742245 ISSN: 0916-8508.
Microsoft Word, Users Guide, Version 6.0, pp. 487-489, 549-555, 560-564, 572-575, 599-613, 616-631 (1993).
Ojanperä and Prasad, eds., Wideband CDMA for Third Generation Mobile Communications (1998) [excerpts but not all pages numbered].
Perritt, "Knowbots, Permissions I Ieaders and Contract Law," Paper for the Conference on Technological Strategies for Protecting Intellectual Property in the Networked Multimedia Environment, pp. 1-22 (Apr. 2-3, 1993 with revisions of Apr. 30, 1993).
Raggett, (Hewlett Packard), "HTML+(Hypertext markup language)," pp. 1-31 (Jul. 12, 1993) URL:http://ciieseer.ist.psu.edu/correct/340709.
Samuelson et al, "Intellectual Property Rights for Digital Library and Hypertext Publishing Systems: An Analysis of Xanadu," Hypertext '91 Proceedings, pp. 39-50 (Dec. 1991).
No Author, "Softlock Services Introduces . . . Softlock Services" Press Release (Jan. 28, 1994).
No Author, "Appendix III—Compatibility with HTML," No Title, pp. 30-31 (no date).
No Editor, No Title, Dictionary pages, pp. 469-472, 593-594 (no date).
Benoit, Digital Television MPEG-1, MPEG-2 and Principles of the DVB System, pp. 75-80, 116-121 (no date).
Benoit, Digital Television MPEG-1, MPEG-2 and Principles of the DVB System, $2^{nd}$ edition, pp. 74-80 (no date).
AH Digital Audio and Video Series, "DTV Receivers and Measurements," Understanding Digital Terrestrial Broadcasting, pp. 159-164 (no date).
O'Driscoll, The Essential Guide to Digital Set-Top Boxes and Interactive TV, pp. 6-24 (no date).
IUS Mentis, "The ElGamal Public Key System," pp. 1-2 (Oct. 1, 2005) online at http://www.iusmentis.com/technology/encyrption/elgamal/.
Schneier, "Crypto Bibliography," Index of Crypto Papers Available Online, pp. 1-2 (online) (no date).
No Author, No Title, pp. 344-355 (no date).
No Author, "Part Four Networks," No Title, pp. 639-714 (no date).
Microsoft Word User's Guide, pp. 773-774, 315-316, 487-489, 561-564, 744, 624-633 (1993).
No Author, "What is the ElGamal Cryptosystem," p. 1 (Nov. 27, 2006) online at http://www.x5.net/faqs/crypto/q29.html.
Johnson et al., "A Secure Distributed Capability Based System," ACM, pp. 392-402 (1985).
Wikipedia, "El Gamal Encyption," pp. 1-3 (last modified Nov. 2, 2006) online at http://en.wikipedia.org/wiki/ElGamal_encryption.
Blaze, "Atomic Proxy Cryptography," p. 1 Abstract (Oct. 20, 1998).
Blaze, "Matt Blaze's Technical Papers," pp. 1-6 (last updatcd Aug. 6, 2006)].
Online Search Results for "inverted file", "inverted index" from www.techweb.com, www.cryer.co.uk, computing-dictionary. thefreedictionary.com, www.nist.gov, en.wikipedia.org, www.cni.org, www.tiscali.co.uk (Jul. 15-16, 2006).
Corporation for National Research Initiatives, "Digital Object Architecture Project", http://www.nnri.reston.va.us/doa.html (updated Nov. 28, 2006).

Stefik, Summary and Analysis of A13 (Kahn, Robert E and Vinton G Cerf, "The Digital Library Project, vol. 1: The World of Knowbots (Draft), An Open Architecture for a Digital Library System and a Plan for its Development," Corporation for National Research Initiatives (Mar. 1988)), pp. 1-25 (May 30, 2007).
ICE 2.0 Specification to be Released as a Document Set, Information Content Exchange web page, 2001-2005, 1 page.
Johnson et al., "A Secure Distributed Capability Based System," Proceedings of the 1985 ACM Annual Conference on the Range of Computing: Mid-80's Perspective: Mid-80's Perspective Association for Computing Machinery pp. 392-402 (1985).
Delaigle, "Digital Watermarking," Spie Conference in Optical Security and Counterfeit Deterrence Techniques, San Jose, CA (Feb. 1996).
Perritt, "Technologies Strategies for Protecting Intellectual Property in the Networked Multimedia Environment," Knowbots, Permissions Headers and Contract Law (Apr. 2-3 1993).
PDF Reference (Second Edition), Adobe Portable Document Format, Version 1.3, Adobe Systems Incorporated, 1985-2000, Addison-Wesley.
Adobe Acrobat 2.0, Information Products Group, Adobe Systems Incorporated, 1994.
File History for U.S. Pat. No. 8,001,053, Nov. 22, 2011 Amendment After Final Rejection.
File History of U.S. Pat. No. 6,135,646 filed Feb. 28, 1997.
File History of U.S. Pat. No. 6,963,859 filed Jan. 16, 2003.
File History of U.S. Pat. No. 7,225,160 filed Dec. 17, 2001.
File History of U.S. Pat. No. 7,269,576 filed Feb. 9, 2004.
File History of U.S. Pat. No. 7,523,072 filed Dec. 16, 2005.
File History of U.S. Pat. No. 7,774,280 filed Oct. 4, 2004.
File History of U.S. Pat. No. 8,001,053 filed Oct. 4, 2004.
File History of U.S. Pat. No. 8,370,956 filed Aug. 13, 2012.
File History of U.S. Pat. No. 8,393,007 filed Aug. 14, 2012.
File History of U.S. Appl. No. 08/967,084 & U.S. Appl. No. 08/344,760, filed Nov. 10, 1997 & filed Nov. 23, 1994.
File History of U.S. Appl. No. 09/778,001, filed Feb. 7, 2001.
Final Decision in *ZTE Corporation and ZTE (USA) Inc.* v. *ContentGuard Holdings Inc.*, IPR2013-00133, Paper 61 (Jul. 1, 2014).
Final Decision in *ZTE Corporation and ZTE (USA) Inc.* v. *ContentGuard Holdings Inc.*, IPR2013-00137, Paper 58 (Jul. 1, 2014).
Final Decision in *ZTE Corporation and ZTE (USA) Inc.* v. *ContentGuard Holdings Inc.*, IPR2013-00139, Paper 57 (Jun. 26, 2014).
Final Office Action mailed Apr. 17, 2006 for U.S. Appl. No. 10/956,070, filed Oct. 4, 2004.
Final Office Action mailed Apr. 17, 2008 for U.S. Appl. No. 10/162,701, filed Jun. 6, 2002.
Final Office Action mailed Aug. 19, 2009 for U.S. Appl. No. 10/956,121, filed Oct. 4, 2004.
Final Office Action mailed May 24, 2006 for U.S. Appl. No. 10/162,701, filed Jun. 6, 2002.
Glenn C. Reid, Thinking in Postscript, Addison-Wesley (1990).
*Google Inc.* v. *Inventor Holdings, LLC,* CBM2014-00002, Paper No. 16 (Apr. 1, 2014).
*Hulu, LLC* v. *Intertainer, Inc.* Case CBM2014-00053, Paper 11 (Jun. 23, 2014).
Iannella, R., Open Digital Rights Language (ODRL), Version 7, http://xml.coverpages.org/ODRL-07.pdf (Oct. 13, 2000).
Internet Dreams Archetypes, Myths, and Metaphors—Stefik foreword.
Kahin, Brian, The Strategic Environment for Protecting Multimedia, IMA Intellectual Property Project Proceedings, Jan. 1994.
"Law Borrowing & Returning," The University of Chicago, available at http://www.lib.uchicago.edu/e/law/usig/borrow/.
Linn R.J., et al., "Copyright and Information Services in the Context of the National Research and Education Network.sup.1," Ima Intellectual Property Project Proceedings, 1994, vol. 1 (1), pp. 9-20.
Microsoft Computer Dictionay (5th Ed.) (2002).
Moffett J., et al., Specifying Discretionary Access Control Policy for Distributed Systems, Computer Communications, vol. 13(9), pp. 571-580 (Nov. 1990).

(56) References Cited

OTHER PUBLICATIONS

Mori, R., Superdistribution: The Concept and Architecture, The Transactions of the Institute of Electronics, Information and Comm. Engineers (Jul. 1990), No. 7, pp. 1133.
Morin, J., Commercialization of Electronic Information, Journal of Organizational and End User Computing, vol. 12, Issue 2 (Apr. 1, 2000).
Needham & Schroeder, Using Encryption for Authentication in Large Networks of Computers (Dec. 1978).
Non-Final Office Action mailed Aug. 10, 2007 for U.S. Appl. No. 10/162,701, filed Jun. 6, 2002.
Non-Final Office Action mailed Apr. 15, 2008 for U.S. Appl. No. 10/956,121, filed Oct. 4, 2004.
Non-Final Office Action mailed Oct. 21, 2005 for U.S. Appl. No. 10/162,701, filed Jun. 6, 2002.
Non-Final Office Action mailed Oct. 25, 2005 for U.S. Appl. No. 10/956,070, filed Oct. 4, 2004.
Notice of Abandonment mailed May 2, 2011 for U.S. Appl. No. 10/162,701, filed Jun. 6. 2002.
Office Patent Trial Practice Guide, 77 Fed. Reg. 157 (Aug. 14, 2012).
Petition for Covered Business Method Patent Review (CBM Case No. CBM2015-00040) of U.S. Pat. No. 7,774,280 filed Dec. 10, 2014.
Petition for Covered Business Method Patent Review (CBM Case No. CBM2015-00043) of U.S. Pat. No. 8,001,053 filed Dec. 10, 2014.
Petition for Inter Partes Review (IPR Case No. IPR2015-00351) of U.S. Pat. No. 7,774,280 filed Dec. 10, 2014.
Petition for Inter Partes Review (IPR Case No. IPR2015-00352) of U.S. Pat. No. 7,774,280 filed Dec. 10, 2014.
Petition for Inter Partes Review (IPR Case No. IPR2015-00353) of U.S. Pat. No. 7,774,280 filed Dec. 10, 2014.
Petition for Inter Partes Review (IPR Case No. IPR2015-00354) of U.S. Pat. No. 7,774,280 filed Dec. 10, 2014.
Petition for Inter Partes Review (IPR Case No. IPR2015-00355) of U.S. Pat. No. 8,001,053 filed Dec. 10, 2014.
Petition for Inter Partes Review (IPR Case No. IPR2015-00356) of U.S. Pat. No. 8,001,053 filed Dec. 10, 2014.
Petition for Inter Partes Review (IPR Case No. IPR2015-00357) of U.S. Pat. No. 8,001,053 filed Dec. 10, 2014.
Petition for Inter Partes Review (IPR Case No. IPR2015-00358) of U.S. Pat. No. 8,001,053 filed Dec. 10, 2014.
Petition for Inter Partes Review (IPR Case No. IPR2015-00440) of U.S. Pat. No. 6,963,859 filed Dec. 22, 2014.
Petition for Inter Partes Review (IPR Case No. IPR2015-00441) of U.S. Pat. No. 6,963,859 filed Dec. 22, 2014.
Lein Harn et al., "A Software Authentication System for the Prevention of Computer Viruses", ACM, 1992.
Department of Defense Standard, "Department of Defense Trusted Computer System Evaluation Criteria" Dec. 26, 1985.
Dorothy Elizabeth Robling Denning, "Cryptography and Data Security", Addison-Wesley Publishing Company, Inc., 1982.
"Technological Strategies for Protecting Intellectual Property in the Networked Multimedia Environment", IMA Proceedings, Jan. 1994, vol. 1, Issue 1.
Decision—Denying Institution of Covered Business Method Patent Review in *Google Inc.* v. *ContentGuard Holdings Inc.*, CBM2015-00043, Paper 9 (Jun. 26, 2015).
Decision—Denying Institution of Inter Partes Review in *Apple Inc.* v. *ContentGuard Holdings Inc.*, IPR2015-00355, Paper 9 (Jun. 26, 2015).
Decision—Denying Institution of Inter Partes Review in *Apple Inc.* v. *ContentGuard Holdings Inc.*, IPR2015-00356, Paper 9 (Jun. 26, 2015).
Decision—Denying Institution of Inter Partes Review in *Apple Inc.* v. *ContentGuard Holdings Inc.*, IPR2015-00357, Paper 9 (Jun. 29, 2015).
Decision—Denying Institution of Inter Partes Review in *Apple Inc.* v. *ContentGuard Holdings Inc.*, IPR2015-00358, Paper 9 (Jul. 2, 2015).
Decision—Institution of Covered Business Method Patent Review in *Google Inc.* v. *ContentGuard Holdings Inc.*, CBM2015-00040, Paper 9 (Jun. 24, 2015).
Decision—Denying Institution of Inter Partes Review in *Apple Inc.* v. *ContentGuard Holdings Inc.*, IPR2015-00351, Paper 9 (Jun. 24, 2015).
Decision—Denying Institution of Inter Partes Review in *Apple Inc.* v. *ContentGuard Holdings Inc.*, IPR2015-00352, Paper 9 (Jun. 24, 2015).
Decision—Denying Institution of Inter Partes Review in *Apple Inc.* v. *ContentGuard Holdings Inc.*, IPR2015-00353, Paper 9 (Jun. 25, 2015).
Decision—Denying Institution of Inter Partes Review in *Apple Inc.* v. *ContentGuard Holdings Inc.*, IPR2015-00354, Paper 12 (Jul. 1, 2015).
Decision—Denying Institution of Inter Partes Review in *Apple Inc.* v. *ContentGuard Holdings Inc.*, IPR2015-00440, Paper 11 (Jul. 13, 2015).
Decision—Denying Institution of Inter Partes Review in *Apple Inc.* v. *ContentGuard Holdings Inc.*, IPR2015-00441, Paper 11 (Jul. 13, 2015).
Decision—Denying Institution of Inter Partes Review in *Apple Inc.* v. *ContentGuard Holdings Inc.*, IPR2015-00442, Paper 9 (Jul. 13, 2015).
Decision—Denying Institution of Inter Partes Review in *Apple Inc.* v. *ContentGuard Holdings Inc.*, IPR2015-00443, Paper 9 (Jul. 9, 2015).
Decision—Denying Institution of Inter Partes Review in *Apple Inc.* v. *ContentGuard Holdings Inc.*, IPR2015-00444, Paper 9 (Jul. 9, 2015).
Decision—Denying Institution of Inter Partes Review in *Apple Inc.* v. *ContentGuard Holdings Inc.*, IPR2015-00445, Paper 9 (Jul. 9, 2015).
Decision—Denying Institution of Inter Partes Review in *Apple Inc.* v. *ContentGuard Holdings Inc.*, IPR2015-00446, Paper 11 (Jul. 10, 2015).
Decision—Denying Institution of Inter Partes Review in *Apple Inc.* v. *ContentGuard Holdings Inc.*, IPR2015-00447, Paper 9 (Jul. 10, 2015).
Decision—Denying Inter Partes Review in *Apple Inc.* v. *ContentGuard Holdings Inc.*, IPR2015-00448, Paper 9 (Jul. 10, 2015).
Decision—Denying Inter Partes Review in *Apple Inc.* v. *ContentGuard Holdings Inc.*, IPR2015-00449, Paper 10 (Jul. 15, 2015).
Decision—Denying Institution of Inter Partes Review in *Apple Inc.* v. *ContentGuard Holdings Inc.*, IPR2015-00450, Paper 9 (Jun. 29, 2015).
Decision—Denying Institution of Inter Partes Review in *Apple Inc.* v. *ContentGuard Holdings Inc.*, IPR2015-00451, Paper 9 (Jul. 13, 2015).
Decision—Denying Institution of Inter Partes Review in *Apple Inc.* v. *ContentGuard Holdings Inc.*, IPR2015-00452, Paper 9 (Jul. 13, 2015).
Decision—Denying Institution of Inter Partes Review in *Apple Inc.* v. *ContentGuard Holdings Inc.*, IPR2015-00453, Paper 9 (Jul. 13, 2015).
Decision—Denying Institution of Inter Partes Review in *Apple Inc.* v. *ContentGuard Holdings Inc.*, IPR2015-00454, Paper 9 (Jul. 13, 2015).
Decision—Denying Institution of Inter Partes Review in *Apple Inc.* v. *ContentGuard Holdings Inc.*, IPR2015-00455, Paper 9 (Jul. 6, 2015).
Decision—Denying Institution of Inter Partes Review in *Apple Inc.* v. *ContentGuard Holdings Inc.*, IPR2015-00456, Paper 9 (Jun. 15, 2015).
Decision—Denying Institution of Inter Partes Review in *Apple Inc.* v. *ContentGuard Holdings Inc.*, IPR2015-00457, Paper 9 (Jun. 30, 2015).

(56) References Cited

OTHER PUBLICATIONS

Decision—Denying Institution of Inter Partes Review in *Apple Inc. v. ContentGuard Holdings Inc.,* IPR2015-00458, Paper 9 (Jul. 15, 2015).
Petition for Covered Business Method Patent Review (CBM Case No. CBM2015-00160) of U.S. Pat. No. 7,774,280 filed Jul. 17, 2015.
Decision—Institution of Covered Business Method Patent Review in *Apple Inc. v. ContentGuard Holdings Inc.,* CBM2015-00160, Paper 7 (Sep. 11, 2015).
Petition for Inter Partes Review (IPR Case No. IPR2015-00442) of U.S. Pat. No. 6,963,859 filed Dec. 22, 2014.
Petition for Inter Partes Review (IPR Case No. IPR2015-00443) of U.S. Pat. No. 7,523,072 filed Dec. 22, 2014.
Petition for Inter Partes Review (IPR Case No. IPR2015-00444) of U.S. Pat. No. 7,523,072 filed Dec. 22, 2014.
Petition for Inter Partes Review (IPR Case No. IPR2015-00445) of U.S. Pat. No. 7,523,072 filed Dec. 22, 2014.
Petition for Inter Partes Review (IPR Case No. IPR2015-00446) of U.S. Pat. No. 8,370,956 filed Dec. 22, 2014.
Petition for Inter Partes Review (IPR Case No. IPR2015-00447) of U.S. Pat. No. 8,370,956 filed Dec. 22, 2014.
Petition for Inter Partes Review (IPR Case No. IPR2015-00448) of U.S. Pat. No. 8,370,956 filed Dec. 22, 2014.
Petition for Inter Partes Review (IPR Case No. IPR2015-00449) of U.S. Pat. No. 8,393,007 filed Dec. 22, 2014.
Petition for Inter Partes Review (IPR Case No. IPR2015-00450) of U.S. Pat. No. 8,393,007 filed Dec. 22, 2014.
Petition for Inter Partes Review (IPR Case No. IPR2015-00451) of U.S. Pat. No. 8,393,007 filed Dec. 22, 2014.
Petition for Inter Partes Review (IPR Case No. IPR2015-00452) of U.S. Pat. No. 7,269,576 filed Dec. 22, 2014.
Petition for Inter Partes Review (IPR Case No. IPR2015-00453) of U.S. Pat. No. 7,269,576 filed Dec. 22, 2014.
Petition for Inter Partes Review (IPR Case No. IPR2015-00454) of U.S. Pat. No. 7,269,576 filed Dec. 22, 2014.
Petition for Inter Partes Review (IPR Case No. IPR2015-00455) of U.S. Pat. No. 7,269,576 filed Dec. 22, 2014.
Petition for Inter Partes Review (IPR Case No. IPR2015-00456) of U.S. Pat. No. 7,269,576 filed Dec. 22, 2014.
Petition for Inter Partes Review (IPR Case No. IPR2015-00457) of U.S. Pat. No. 7,225,160 filed Dec. 22, 2014.
Petition for Inter Partes Review (IPR Case No. IPR2015-00458) of U.S. Pat. No. 7,225,160 filed Dec. 22, 2014.
Proceedings of the Technological Strategies for Protecting Intellectual Property in the Networked Multimedia Environment, Journal of the Interactive Multimedia Association Intellectual Property Project (Jan. 1, 1994).
Record of Oral Hearing, Sessions 1 and 2, in *ZTE Corporation and ZTE (USA) Inc. v. ContentGuard Holdings Inc.,* IPR2013-00138, Paper 54.
Remarks in Amendment of U.S. Appl. No. 10/956,070 mailed Jul. 17, 2006.
Remarks in Amendment of U.S. Appl. No. 10/956,070 mailed Nov. 22, 2010.
Remarks in Amendment of U.S. Appl. No. 10/956,070 mailed Jan. 24, 2006.
Remarks in Amendment of U.S. Appl. No. 10/956,070 mailed Oct. 31, 2007.
Remarks in Amendment of U.S. Appl. No. 10/956,121 mailed Mar. 15, 2010.
Remarks in Amendment of U.S. Appl. No. 10/956,121 mailed May 28, 2009.
RFC 1422, Privacy Enhanced Mail (PEM) Part II: Certificate-Based Key Management, 1993.
S. White & L. Comerford, ABYSS: A Trusted Architecture for Software Protection (1990).
*Salesforce.com, Inc. v. Virtualagility, Inc.,* CBM2013-00024, Paper No. 47 (Sep. 16, 2014).
Saltzer J.,& M. Schroeder, The Protection of Information in Computer Systems, Proceedings of the IEEE, vol. 63, No. 9 (Sep. 1975).
*SAP America, Inc. v. Versata Dev. Group, Inc.,* CBM2012-00001, Paper 36 (Jan. 9, 2013).
*SAP America, Inc. v. Versata Development Group, Inc.,* CBM2012-00001, Paper No. 70 (Jun. 11, 2013).
Steiner et al., Kerberos: An Authentication Service for Open Network Systems (MIT 1988).
Summons in Case No. 2:13-CV-01112.
T. Berners-Lee & D. Connolly, RFC 1866, Hypertext Markup Language v2.0 (Nov. 1995).
The Copy-Protection Wars, PC Magazine Cover, Table of contents, 164-182, 1986.
The Digital Property Rights Language—Manual and Tutorial—XML Edition, Version 2, http://xml.coverpages.org/DPRLmanual-XML2.html (Nov. 13, 1998).
Tygar J.D., et al., "Dyad: A System for Using Physically Secure Coprocessors," Ima Intellectual Property Project Proceedings, 1994, vol. 1 (1), pp. 121-152.
*Ultramercial, Inc. et al. v. Hulu, LLC et al.,* 2010-1544 (Fed Cir. Nov. 14, 2014).
Continuation-in-Part U.S. Appl. No. 09/867,745, filed May 31, 2001.
Continuation-in-Part U.S. Appl. No. 10/162,212, filed Jun. 5, 2002.
Continuation-in-Part U.S. Appl. No. 10/162,701, filed Jun. 6, 2002.
U.S. Appl. No. 60/296,113, filed Jun. 7, 2001.
U.S. Appl. No. 60/296,117, filed Jun. 7, 2001.
U.S. Appl. No. 60/296,118, filed Jun. 7, 2001.
U.S. Appl. No. 60/331,621, filed Nov. 20, 2001.
U.S. Appl. No. 60/331,623, filed Nov. 20, 2001.
U.S. Appl. No. 60/331,624, filed Nov. 20, 2001.
U.S. Appl. No. 60/331,625, filed Nov. 20, 2001.
*Volusion, Inc. v. Versata Software, Inc. et al.,* CBM2013-00017, Paper No. 8 (Oct. 24, 2013).
Weingart S., Physical Security for the µABYSS System, Proceedings of the IEEE Symposium on Security and Privacy (Apr. 27-29, 1987).
*Alice Corp. Pty. Ltd. v. CLS Bank Int'l,* 134 S.Ct. 2347 (Jun. 19, 2014).
American Heritage Dictionary Third Edition.
Amir Herzberg, Shlomit S. Pinter, "Public Protection of Software," in Advances in Cryptology: Proc. Crypto 85, Hugh C. Williams (cd.), pp. 158 (1986).
*Apple Inc. v. Sightsound Techs., LLC,* CBM2013-00019, Paper No. 17 (Oct. 8, 2013).
*Bloomberg Inc. et al. v. Markets-Alert Pty Ltd,* CBM2013-00005, Paper No. 18 (Mar. 29, 2013).
Board of Patent Appeals and Interferences Decision on Appeal, U.S. Appl. No. 10/162,701 mailed Jul. 27, 2010.
Bray et al., "Extensible Markup Language (XML) 1.0," W3C Recommendation, Feb. 10, 1998.
Bruce Schneier, Applied Cryptography (Chapters 1-3, 7, 12, 13, 17)—1994.
Cina V., et al., ABYSS: A Basic Yorktown Security System: PC Asset Protection Concepts, IBM Research Report No. RC 12401 (Dec. 1986).
CNRI Workshop on the Protection of Intellectual Property Rights in a Digital Library System May 18-19, 1989.
Comparison of Specification of U.S. Appl. No. 08/967,084 to Specification of U.S. Appl. No. 09/778,001.
Comparison of Specification of U.S. Appl. No. 09/778,001 to Specification of U.S. Pat. No. 7,225,160.
Comparison of Stefik '980 Patent to Specification of U.S. Appl. No. 09/778,001.
Complaint, *ContentGuard Holdings, Inv. V. Google Inc.,* Case No. 2:14-cv-00061-JRG-RSP (E.D. Tex.), Dkt. No. 1.
Congressional Record—Senate, 157 Cong. Rec. S1360-1394 (daily ed. Mar. 8, 2011) (Sen. Schumer).
ContentGuard's Opening Claim Construction Brief, 2:13-cv-01112 (EDTX) Dkt No. 304.
Curriculum Vitae for Alan Sherman.
Curriculum Vitae of Atul Prakash.
D. Denning, Cryptography and Data Security (1982).

(56) References Cited

OTHER PUBLICATIONS

Data networks and open system communicationjs X.509 Standard.
Davida G., et al., Defending Systems Against Viruses through Cryptographic Authentication, IEEE 1989.
Decision on Appeal, U.S. Appl. No. 10/162,212 (BPAI) mailed Dec. 16, 2009.
Decision to Institute in *ZTE Corporation and ZTE (USA) Inc. v. ContentGuard Holdings Inc.*, IPR2013-00133, Paper 15 (Jul. 1, 2013).
Decision to Institute in *ZTE Corporation and ZTE (USA) Inc. v. ContentGuard Holdings Inc.*, IPR2013-00134, Paper 12 (Jun. 19, 2013).
Decision to Institute in *ZTE Corporation and ZTE (USA) Inc. v. ContentGuard Holdings Inc.*, IPR2013-00136, Paper 11 (Jul. 16, 2013).
Decision to Institute in *ZTE Corporation and ZTE (USA) Inc. v. ContentGuard Holdings Inc.*, IPR2013-00137, Paper 17 (Jul. 1, 2013).
Decision to Institute in *ZTE Corporation and ZTE (USA) Inc. v. ContentGuard Holdings Inc.*, IPR2013-00138, Paper 17 (Jul. 1, 2013).
Decision to Institute in *ZTE Corporation and ZTE (USA) Inc. v. ContentGuard Holdings Inc.*, IPR2013-00139, Paper 15 (Jul. 9, 2013).
Declaration of Alan Sherman, Ph. D. regarding patent 160.
Declaration of Alan Sherman, Ph. D. regarding patents 859, 072, 956, 007, 576.
Declaration of Atul Prakash "System and Method for Managing Transfer of Rights Using Shared State Variables".
Declaration of Benjamin Goldberg, Ph.D.
Declaration of Dr. Goodrich in support of ContentGuard's Opening Claim Construction Brief—Exhibit K of Doc. No. 304.
Definition of "Meta," Oxford English Dictionary www.oxforddictionaries.com/definition/english/meta.
Definition of "Processor," The American Heritage® Dictionary of the English Language, Fourth Edition, 2000 Houghton Mifflin Company, available at http://www.thefreedictionary.com/processor.
Definition of "Right," Merriam-Webster Online Dictionary, available at http://www.merriam-webster.com/dictionary/right.
Definition of "Variable," The Free Dictionary, available at http://www.thefreedictionary.com/variable+%28computer+science%29.
Diffie-Hellman, "New Directions in Cryptography," IEEE Transactions on Information Theory, vol. IT-22, No. 6, Nov. 1976.
*EBay, Inc. v. Paid, Inc.*, CBM2014-00125, Paper No. 15 (Sep. 30, 2014).
Electronic Books Exchange (EBX) Specification 0.8 (Jul. 2000).
*Experian Marketing Solutions, Inc. v. RPost Communications Ltd.*, CBM2014-00010, Paper No. 20 (Apr. 22, 2014).
Federal Information Processing Standards Publication Pub 140-1,dated Jan. 11, 1994.
File History for U.S. Appl. No. 10/163,634, Feb. 18, 2010 Decision on Appeal.
File History for U.S. Pat. No. 7,774,280, Dec. 29, 2008 Non-Final Rejection.
File History for U.S. Pat. No. 7,774,280, Mar. 29, 2010 Notice of Allowance.
File History for U.S. Pat. No. 7,774,280, May 28, 2009 Applicant Response to Final Rejection.
File History for U.S. Pat. No. 8,001,053, Aug. 13, 2008 Applicant Appeal Brief.
File History for U.S. Pat. No. 8,001,053, Feb. 28, 2007 Amendment After Non-Final Rejection Response to Office Action.
File History for U.S. Pat. No. 8,001,053, Mar. 16, 2010 Supplemental Examiner's Answer to Appeal Brief.
File History for U.S. Pat. No. 8,001,053, May 17, 2010 Response to Supplemental Examiner's Answer.
White, S., et al., ABYSS: A Trusted Architecture for Software Protection, IEEE (1987).
William Aspray, The Stored Program Concept, IEEE Spectrum Sep. 1990.
*ZTE Corp. and ZTE (USA) Inc. v. ContentGuard Holdings*, IPR2013-00133, Paper No. 61 (Jul. 1, 2014).

\* cited by examiner

RIGHTS EXPRESSION PROFILE SYSTEM AND METHOD USING TEMPLATES

CROSS REFERENCE TO RELATED DOCUMENTS

The present invention claims benefit of priority under 35 U.S.C. §119(e) to U.S. patent application Ser. No. 10/388,162 of Raley et al., entitled "RIGHTS EXPRESSION PROFILE SYSTEM AND METHOD USING TEMPLATES", filed on Mar. 14, 2003, which claims priority to U.S. Provisional Patent Application Ser. No. 60/363,932 of Raley et al., entitled "USE OF RIGHTS EXPRESSIONS IN APPLICATIONS WITH PERFORMANCE CONSTRAINTS", filed on Mar. 14, 2002, the entire disclosures of which are hereby incorporated by reference.

BACKGROUND OF THE INVENTION

Field of the Invention

This invention generally relates to controlling use of content, or other items, through rights expressions associated with the content or other items, and more particularly to a system and method for generating templates of rights expressions.

Description of Related Art

One of the most important issues concerning the widespread distribution of digital content, such as documents, music, movies, software, information, and the like, in forms usable by computing devices, via electronic means, and the Internet in particular, is the provision of the ability to enforce the intellectual property rights during the distribution and use of the digital content. Technologies for resolving this problem are referred to as Digital Rights Management (DRM) herein. However, there are a number of issues to be considered in effecting a DRM system, such as authentication, authorization, accounting, payment and financial clearing, rights specification, rights verification, rights enforcement, and document protection issues, to name but a few.

For example, in the world of printed documents and other physical content, a work created by an author is usually provided to a publisher, which formats and prints numerous copies of the work. The copies are then sent by a distributor to bookstores or other retail outlets, from which the copies are purchased by end users. While the low quality of copying and the high cost of distributing printed material have served as deterrents to unauthorized copying of most printed documents, it is much easier to copy, modify, and redistribute unprotected digital content with high quality. Therefore, there is a need for mechanisms to protect digital content.

Difficulties associated with preventing, or even deterring, people from making unauthorized copies of electronic content within current general-purpose computing and communications systems, such as personal computers, workstations, and other devices connected over communications networks, such as local area networks (LANs), intranets, and the Internet, are widely recognized. Many attempts to provide hardware-based solutions to prevent unauthorized copying have proven to be unsuccessful. Moreover, the deployment of high bandwidth or broadband communications technologies and the development of what is presently known as the National Information Infrastructure (NII) is making it more convenient to distribute large documents electronically, including video files, such as full length motion pictures, and this makes it easier to proliferate unauthorized copying and distribution of digital content. Therefore, the need for further development of DRM technologies is becoming a high priority.

Accordingly, commonly-assigned U.S. Pat. No. 5,634,012 discloses a DRM system for controlling the distribution of digital content, wherein devices of the DRM system can include a repository associated therewith. A predetermined set of usage transaction steps define a protocol used by the repositories for enforcing usage rights associated with the content. Usage rights persist with the content and the usage rights associated with the content comprise a digital work. The usage rights can permit various manners of use of the content, such as a right to view or print or display the content, a right to use the content only once, a right to distribute or redistribute the content, and the like. Such usage rights can be made contingent on payment or other conditions. However, there is still a further need for systems and methods for expressing and enforcing usage rights and/or conditions associated with content in a flexible and robust manner.

SUMMARY OF THE INVENTION

The above and other needs are addressed by embodiments of the present invention, which provide an improved system and method for expressing usage rights for content or other items based on modulated or varied signals or graphical representations of the usage rights.

According, in one aspect of an embodiment of the present invention, there is provided a system and method for creating a rights expression for association with an item for use in a system for controlling use of the item in accordance with the rights expression, including specifying rights expression information indicating a manner of use of an item, the rights expression information including at least one element, the element having a variable and corresponding value for the variable; and performing an encoding process, including determining an identifier associated with a template corresponding to the rights expression information, extracting from the rights expression information the value for the variable corresponding to the element, and encoding a license adapted to be enforced on a device based on the variable and the identifier, the license including an identification of the template and the value for the variable.

Still other aspects, features, and advantages of the present invention are readily apparent from the following detailed description, simply by illustrating a number of exemplary embodiments and implementations, including the best mode contemplated for carrying out the present invention. The present invention is also capable of other and different embodiments, and its several details can be modified in various respects, all without departing from the spirit and scope of the present invention. Accordingly, the drawings and descriptions are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

A system and method for profiling rights expressions are described. In the following description, for purposes of explanation, numerous specific details are set forth in order to provide a thorough understanding of the present invention. It is apparent to one skilled in the art, however, that the present invention can be practiced without these specific details or with equivalent arrangements. In some instances, well-known structures and devices are shown in block diagram form in order to avoid unnecessarily obscuring the present invention.

As noted above, authentication, authorization, accounting, payment and financial clearing, rights specification, rights verification, rights enforcement, and document protection issues should be addressed by a Digital Rights Management system. Commonly-assigned U.S. Pat. No. 5,530,235, U.S. Pat. No. 5,629,980, U.S. Pat. No. 5,634,012, U.S. Pat. No. 5,638,443, U.S. Pat. No. 5,715,403, U.S. Pat. No. 6,233,684, and U.S. Pat. No. 6,236,971, the entire disclosures of all of which are hereby incorporated by reference herein, disclose DRM systems addressing these and other issues.

A human-readable, machine-readable rights expression language, such as XrML or an XML-based language, can be used to express a rights expression. Advantageously, a rights expression, such as a license, can express a usage right specifying a permitted manner of use of an item, such as digital content, services. However, many digital content consumption devices, for example, resource-constrained devices, such as MP3 players, mobile phones, handheld device, PDAs, set-top boxes, and Internet appliances can have limited storage capabilities, and processing capabilities. Accordingly, it can be difficult for such devices to include full-featured rights expression interpreters, such as XrML interpreters or XML interpreters, for processing rights expressions.

The present invention includes recognition that resource-constrained devices can benefit from employing a rights expression, for example, to consume digital content. However, the associated rights expression parsing tools, transport mechanisms, and encoding mechanisms can prove taxing for such devices, resulting in less than optimal consumption of the digital content.

Therefore, there exists a need for optimizing rights expressions, the resources employed to interpret rights expressions, so that resource-constrained devices can enjoy the full benefit of employing rights expressions in an efficient and robust manner. The exemplary embodiments, as described herein, address the above and other problems by providing exemplary techniques based on exemplary profiles, and templates.

Figure 1:
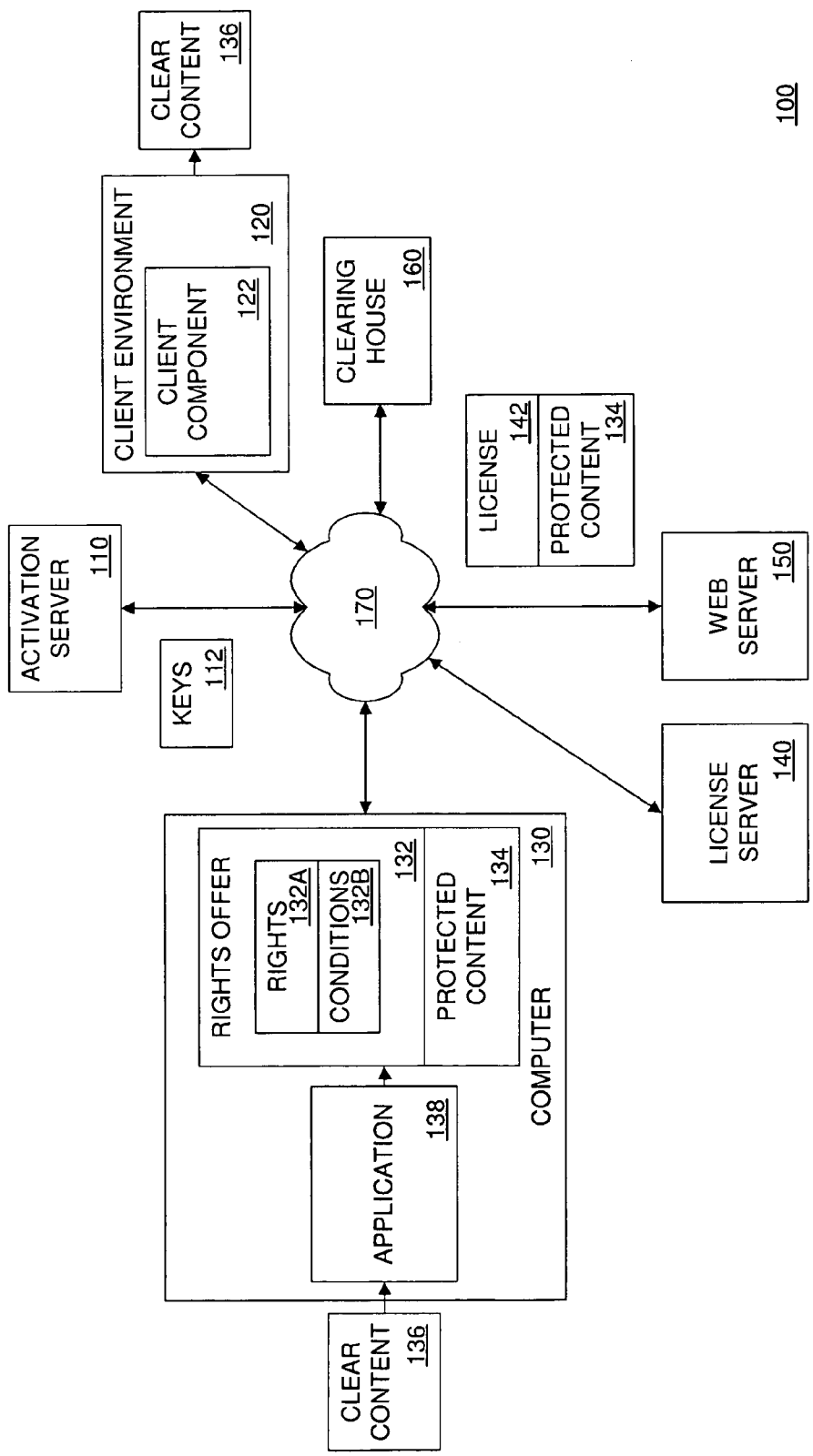
FIG. 1 illustrates an exemplary Digital Rights Management system on which various embodiments of the present invention can be implemented.

Referring now to the drawings, wherein like reference numerals designate identical or corresponding parts throughout the several views, and more particularly to FIG. 1 thereof, there is illustrated a Digital Rights Management system 100 that can be used in connection with the described exemplary embodiments to specify and enforce usage rights for content, services, or other property. In FIG. 1, the Digital Rights Management system 100 includes a user activation component in the form of an activation server 110 that issues a set of public and private key pairs 112 to a content user in a protected fashion. Typically, when the user uses the Digital Rights Management system 100 for the first time, the user installs software that, for example, works with, or includes, a rendering application for a particular content format.

The software is installed in a client environment 120, for example, such as a computing device associated with the user. The software can be part of the Digital Rights Management system 100 and can be used to access protected content 134. After the installation, the software can be activated. During the activation process, some information is exchanged between the activation server 110 and the client environment 120. A client software component 122 can be downloaded and installed in the client environment 120. The client software component 122 can be tamper resistant and can include the set of public and private key pairs 112 issued by the activation server 110, as well as other components.

A rights offer 132 can be associated with the protected content 134 and can specify usage rights 132A that are available to an end-user, for example, when one or more corresponding conditions 132B are satisfied. A license server 140 manages the encryption keys 112 and issues a license 142 for the protected content 134. The license 142 can embody the actual granting of the usage rights 132A to the end user. For example, the rights offer 132 may grant the end user the right to view the protected content 134 on the condition of payment of a fee of five dollars, and the right to print the protected content on the condition of payment of a fee of ten dollars. The license 142 can be issued for the view right when the five dollar fee has been paid and/or for the print right when 10 dollar fee has been paid. The client component 122 interprets and enforces the rights that have been specified in the license 142.

Clear content 136, such as unprotected content, and the like, can be prepared, for example, with an application 138, such as a document preparation application, installed on a computer 130 associated with a content publisher, a content distributor, a content service provider, or any other suitable party. Preparation of the clear content 136 can include specifying the usage rights 132A and the conditions 132B under which the clear content 136 can be used, associating the rights offer 132 with the clear content 136, and protecting the clear content 136 with, for example, a cryptography algorithm to generate the protected content 134. A rights language, such as XrML, eXtensible Access Control Markup Language (XACML), Open Digital Rights Language (ODRL), and the like, can be used to specify the rights offer 132. However, the rights offer 132 can be specified in any suitable manner. Note the phrase "specifying rights information", as used herein, refers to creating, deriving, or otherwise utilizing information that relates to rights expressions. Also, the rights offer 132 can be in the form of a pre-defined specification, profile, template, and the like, that can be associated with the protected content 134. Accordingly, the process of specifying the rights offer 132 can include any suitable process for associating rights, conditions, and the like, with content. The rights offer 132 associated with the protected content 134 and the encryption key 112 used to encrypt the clear content 136 can be transmitted to the license server 140.

A typical workflow for the Digital Rights Management system 100 can include a user operating within the client environment 120 being activated for receiving the protected content 134 by the activation server 110. The activation process results in the public and private key pair 112, and, for example, some user and/or machine-specific information, and the like, being downloaded to the client environment 120 in the form of the client software component 122. The activation process can be accomplished, for example, at any suitable time prior to the issuing of the license 142.

When the user wishes to use the protected content 134, the user makes a request for the protected content 134. For example, the user might browse a Web site running on a Web server 150, using a browser installed in the client environment 120, and attempt to download the protected content 134. During this process, the user may go through a series of steps possibly including a fee transaction, such as in the sale of content, other transactions, such as collection of information, and the like. When the appropriate conditions and other prerequisites, such as the collection of a fee and verification that the user has been activated, are satisfied, the Web server 150 contacts the license server 140, for example, through a secure communications channel, such as a channel using a Secure Sockets Layer (SSL). The license server 140 then generates the license 142 for the protected content 134 and the Web server 150 downloads both the protected content 134 and the license 142. The license 142 can include the appropriate usage rights of the usage rights 132A and can be downloaded from the license server 140 or an associated device. The protected content 134 can be downloaded from the computer 130 associated with a publisher, distributor, or other party. The rights offer 132 can be persistent and remain associated with the protected content 134.

The client software component 122 in the client environment 120 can then proceed to interpret the license 142 and allow use of the protected content 134 based on the rights 132A and the conditions 132B specified in the license 142. The interpretation and enforcement of the usage rights, for example, are further described in commonly-assigned U.S. Pat. No. 5,530,235, U.S. Pat. No. 5,629,980, U.S. Pat. No. 5,634,012, U.S. Pat. No. 5,638,443, U.S. Pat. No. 5,715,403, U.S. Pat. No. 6,233,684, and U.S. Pat. No. 6,236,971. The above steps can take place sequentially, approximately simultaneously, in various orders, and the like.

The Digital Rights Management system 100 addresses security aspects of protecting the protected content 134. In particular, the Digital Rights Management system 100 can authenticate the license 142 that has been issued by the license server 140. One way to accomplish such authentication is for the client software component 122 to determine if the licenses 142 can be trusted. In other words, the client software component 122 can include the capability to verify and/or validate the cryptographic signature, or other identifying characteristic of the license 142. During the activation step described above, the client environment 120 and the license server 140 can receive the set of keys 112, for example, in a tamper-resistant software package that can include other components, such as the client software component 122 for the activated client environment 120 to verify the signature of the license 142.

The Digital Rights Management system 100 is of an exemplary nature and can be implemented in numerous other equivalent arrangements. For example, the license 142 and the protected content 134 can be distributed from different entities. As another example, the rights offer 132 can be associated with the protected content 134 by a party other than the party preparing the protected content 134. As a further example, a clearinghouse 160 can be used to process payment transactions and verify payment prior to issuing the license 142. Moreover, the various processes and transactions can be performed, for example, via online and/or offline environments and/or combinations thereof. For example, an end user could download content to a computer and then transfer the content from the computer to a personal digital assistant (PDA). The end user could then buy a license for the content, for example, via a supermarket kiosk, a cash register, a prep-paid license card, and the like, and then transfer the license to the PDA. The end user could then activate the content for use on the PDA and/or the computer. In such an offline scenario, the various devices can, but need not, communicate directly with one another and information can be exchanged in any suitable manner, such as by physically moving media between the devices.

The exemplary profiles and templates, as described herein, can be employed to compress the size of a rights expression, such as an XrML rights expression, and the like. Advantageously, the exemplary profiles and templates can be employed for minimizing the amount of processing resources employed for interpreting a rights expression by a resource-constrained application, device, system, platform, and the like.

According to an exemplary embodiment, if X can be considered to be the set of all conformant expressions of a rights expression language, then a rights expression language profile can be defined as some non-empty subset Y of X. If a given expression E can be an element of Y, then E can be said to be in the profile. However, if E is not an element of Y, then E can be said to be invalid against the profile. Thus, according to an exemplary embodiment, profiling of a rights expression language can include identifying subsets of the rights expression language that a particular interpreter can support, and interpret. Advantageously, profiling can be employed for allowing resource-constrained devices to participate in a rights-interpreted language system.

According to the exemplary embodiments, there are numerous forms of and ways to create rights expression language profiles, such as by employing mechanisms based templates. Techniques associated with templates, for example, mapping of templates to objects, such as binary tokens, can be referred to as template mapping to describe the collection of such technologies.

The exemplary template mapping and profiling techniques compress the size of a rights expression. For example, the best compression that can be achieved for a rights expression language can be to identify all distinct rights expressions that can exist within a given domain, and assign each and every rights expression a reference value. In this way, a rights expression language interpreter would only need to lookup a given rights expression by the reference value in order to interpret the corresponding rights expression. The exemplary template mapping and profiling techniques attempt to reach such a level of compression via exemplary template, and profile encoding, and decoding processes.

An exemplary encoding process can include removing one or more values for variable fields from a rights expression to generate a template or profile for the rights expression, and assigning an identifier (id) to the template or profile. Advantageously, the identifier can be transmitted along with the one or more values for the variable fields of the rights expression, for example, to a resource-constrained device, instead of transmitting the entire or raw rights expression.

An exemplary decoding process can include receiving the identifier and the one or more values for the variable fields, and interpreting the rights expression, based on the transmitted values, for example, on a resource-constrained device. Advantageously, such an interpreter can include minimal computing resources, instead of a full rights expression language parser that would be employed to interpret the entire or raw rights expression.

In addition, the exemplary encoding, and decoding techniques, advantageously, can provide lossless compression, and decompression. For example, an original rights expression can be generated, recreated, reconstructed or copied, by populating one or more values for the variable fields from the original rights expression into a template or profile corresponding to the original rights expression, as identified by a corresponding identifier. High-end rights management applications, devices, and systems can employ the reconstructed rights expression, advantageously, providing interoperability with resource-constrained devices.

The following exemplary namespace table, as shown in Table 1 below, illustrates the exemplary template mapping and profiling techniques, as applied to exemplary rights expressions in the form of exemplary XrML licenses related to music, and audio. The XrML Specification can be obtained on the World Wide Web (www) at xrml.org. In addition, a Sample Extension Schema (schema/2001/11/compactMusic) is provided as an Appendix herewith.

TABLE 1

Namespaces Table

| Prefix | Namespace | Schema Description |
|---|---|---|
| (r) | http://www.xrml.org/schema/2001/11/xrml2core | XrML 2.0 Core |
| Sx | http://www.xrml.org/schema/2001/11/xrml2sx | Standard Extension |
| Cx | http://www.xrml.org/schema/2001/11/xrml2cx | Content Extension |
| Cm | http://www.xrml.org/schema/2001/11/xrml2compactMusic | Sample Extension |
| Dsig | http://www.w3.org/2000/09/xmldsig# | Digital Signature |
| Xsi | http://www.w3.org/2001/XMLSchema-instance | Schema Instance |

A rights expression in the form of an XrML license issued by an identified device, can be used specify that a device identified in the license can play an identified song file, as expressed in the following first exemplary license (L1).

First Exemplary License (L1):

```
<license>
  <grant>
    <cm:device cmid="123"/>
    <cx:play/>
```

First Exemplary License (L1):

```
    <cm:song cmid="456"/>
  </grant>
  <cm:issuerDevice>
    <cm:device cmid="024"/>
  </cm:issuerDevice>
</license>
```

With the exemplary license L1, it can be assumed that: (i) license redistribution is not an employed business model, (ii) the employed device can use any suitable song file input mechanism, (iii) the employed device can play the song file, (iv) security is not a concern, as the employed device can be identified by a an identification number, the song file can be identified by an identification number, and the exemplary license L1 identifies the issuing device, without employing a signature, (v) the exemplary license L1 can travel with the song file, so that no searching for the exemplary license L1 is necessary, and (vi) no Internet access is available to the employed device. According to the exemplary license L1, a device with identification number 123 can be granted a usage right to play a song file having identification number 456 an unlimited number of times, according to an issuing device with identification number 024. Additional flexibility can be employed by specifying in a license a limit on the number of times that the device 123 can play the song file 465, as expressed in the following second exemplary license (L2).

Second Exemplary License (L2):

```
<license>
  <grant>
    <cm:device cmid="123"/>
    <cx:play/>
    <cm:song cmid="456"/>
    <sx:exerciseLimit>
      <sx:stateReference>
        <cm:countKeeper key="789">
          <cm:device cmid="123"/>
        </cm:countKeeper>
      </sx:stateReference>
    </sx:exerciseLimit>
  </grant>
  <cm:issuerDevice>
    <cm:device cmid="024"/>
  </cm:issuerDevice>
</license>
```

Accordingly, the exemplary license L2 can be similar to the exemplary license L1, except for bolded portion, which can specify that there can be a limit on the number of times the song file 456 can be played by the device 123, and that the remaining number of times the song file 456 can be played must be counted and stored on the device 123, with a lookup key 789. A license, however, can be employed to allow unlimited license redistribution to identified devices, as expressed in the following third exemplary license (L3).

Third Exemplary License (L3):

```
<license>
  <grant>
    <cm:device cmid="123"/>
    <cx:play/>
    <cm:song cmid="456"/>
  </grant>
```

Third Exemplary License (L3):

```
<grant>
    <cm:device cmid="123"/>
    <issue/>
    <grant>
        <cm:device cmid="111"/>
        <cx:play/>
        <cm:song cmid="456"/>
    </grant>
</grant>
<grant>
    <cm:device cmid="123"/>
    <issue/>
    <grant>
        <cm:device cmid="333"/>
        <cx:play/>
        <cm:song cmid="456"/>
    </grant>
</grant>
<cm:issuerDevice>
    <cm:device cmid="024"/>
</cm:issuerDevice>
</license>
```

The exemplary license L3 can be similar to the exemplary license L1, except for the bolded portion, which can identify the devices as 111 and 333 to which the song file 456 can be redistributed. Accordingly, with the exemplary license L3, the device 123 has the right to issue grants to the devices 111 and 333 to play the song file 456. Advantageously, the devices 111 and 333 do not have to be as sophisticated as the device 123, as the issued licenses would look nearly identical to the exemplary license L1, differing only in the device identifications. A license, however, can allow limited license redistribution to unidentified devices, as expressed in the following fourth exemplary license (L4).

Fourth Exemplary License (L4):

```
<license>
    <grant>
        <cm:device cmid="123"/>
        <cx:play/>
        <cm:song cmid="456"/>
    </grant>
    <grant>
        <forAll varName="otherDevice"/>
        <cm:device cmid="123"/>
        <issue/>
        <grant>
            <cm:device varRef="otherDevice"/>
            <cx:play/>
            <cm:song cmid="456"/>
        </grant>
        <sx:exerciseLimit>
            <sx:stateReference>
                <cm:countKeeper key="555">
                    <cm:device cmid="123"/>
                </cm:countKeeper>
            </sx:stateReference>
        </sx:exerciseLimit>
    </grant>
    <cm:issuerDevice>
        <cm:device cmid="024"/>
    </cm:issuerDevice>
</license>
```

The exemplary license L4 can be similar to the exemplary license L3, except for the bolded portion, which can be used allow or require the device 123 to selectively distribute a license to play the song file 456 to unidentified devices, a limited number of times, with the number of times remaining stored on the device 123 under lookup key 555. Advantageously, the devices to which the device 123 issues the licenses do not have to be as sophisticated as the device 123, as the issued licenses would look nearly identical to the exemplary license L1, differing only in the device identifications.

A license also can specify the playing of an identified song file, on an identified device, to be restricted to a fixed time interval, as expressed in the following fifth exemplary license (L5).

Fifth Exemplary License (L5):

```
<license>
    <grant>
        <cm:device cmid="123"/>
        <cx:play/>
        <cm:song cmid="456"/>
        <validityInterval>
            <notBefore>2002-03-04T05:06:07</notBefore>
            <notAfter>2002-03-11T05:06:07</notAfter>
        </validityInterval>
    </grant>
    <cm:issuerDevice>
        <cm:device cmid="024"/>
    </cm:issuerDevice>
</license>
```

The exemplary license L5 can be similar to the exemplary license L1, except for the bolded portion, which can be used specify that the device 123 can be restricted to playing the song file 456 during the specified time interval. The playing of an identified song file, on an identified device, also can be restricted to a fixed time interval that can start the first time the song file can be played, as expressed in the following sixth exemplary license (L6).

Sixth Exemplary License (L6):

```
<license>
    <grant>
        <cm:device cmid="123"/>
        <cx:play/>
        <cm:song cmid="456"/>
        <sx:validityIntervalFloating>
            <sx:stateReference>
                <cm:intervalKeeper key="777">
                    <cm:device cmid="123"/>
                </cm:intervalKeeper>
            </sx:stateReference>
        </sx:validityIntervalFloating>
    </grant>
    <cm:issuerDevice>
        <cm:device cmid="024"/>
    </cm:issuerDevice>
</license>
```

The exemplary license L6 can be similar to the exemplary license L1, except for the bolded portion, which can be used specify that the device 123 can be restricted to playing the song file 456 from the first time the song file 456 is played, wherein the time remaining and the start time can be stored by the device 123 under lookup key 777. In a further example, a license can be employed to allow the lending by an identified device of an identified song file to up to a predetermined number of other devices, as expressed in the following seventh exemplary license (L7).

Seventh Exemplary License (L7):

```
<license>
    <grant>
        <cm:device cmid="123"/>
        <cx:play/>
        <cm:song cmid="456"/>
    </grant>
    <grant>
        <forAll varName="otherDevice"/>
        <forAll varName="interval"/>
        <cm:device cmid="123"/>
        <issue/>
        <grant>
            <cm:device varRef="otherDevice"/>
            <cx:play/>
            <cm:song cmid="456"/>
            <validityInterval varRef="interval"/>
        </grant>
        <cm:copyManagement>
            <sx:stateReference>
                <cm:copyKeeper key="999">
                    <cm:device cmid="123"/>
                </cm:copyKeeper>
                <serviceParameters>
                    <datum>
                        <validityInterval
                            varRef="interval"/>
                    </datum>
                </serviceParameters>
            </sx:stateReference>
        </cm:copyManagement>
    </grant>
    <cm:issuerDevice>
        <cm:device cmid="024"/>
    </cm:issuerDevice>
</license>
```

The exemplary license L7 can be similar to the exemplary license L4, except for the bolded portion, which can specify a variable time constraint, a copy management constraint. For example, a literal rendering of the bolded portion can be that "the device 123 can choose a device and an interval and can then issue a license allowing the chosen device to play the song file 456 during the chosen interval if the device 123 passes the chosen interval to a copy keeper using a lookup key 999 on the device 123 and the copy keeper verifies that there are still copies remaining for the chosen interval."

Advantageously, the devices to which the device 123 lends the song file 456 do not have to be as sophisticated as the device 123, as the issued licenses would look nearly identical to the exemplary license L5, differing only in the device identifications and the validity interval. By contrast, a song could specified to be played an unlimited number of times, as expressed in the following eighth exemplary license (L8).

Eight Exemplary License (L8):

```
<license>
    <grant>
        <cx:play/>
        <cm:song cmid="456"/>
    </grant>
    <cm:issuerDevice>
        <cm:device cmid="024"/>
    </cm:issuerDevice>
</license>
```

The exemplary license L8 can be similar to the exemplary license L1, except for the omission of the identified device 123. Advantageously, any suitable device can play the song file 456 with the exemplary license L8, whereas with the next example, multiple devices within a same domain can play an identified song file, as expressed in the following ninth exemplary license (L9).

Ninth Exemplary License (L9):

```
<license>
    <grant>
        <forAll varName="device">
            <everyone>
                <cm:myDomain/>
                <trustedIssuer>
                    <cm:device cmid="000"/>
                </trustedIssuer>
            </everyone>
        </forAll>
        <cm:device varRef="device"/>
        <cx:play/>
        <cm:song cmid="456"/>
    </grant>
    <cm:issuerDevice>
        <cm:device cmid="024"/>
    </cm:issuerDevice>
</license>
```

The exemplary license L9 can be similar to the exemplary license L1, except for the bolded portion, which can be read as "every device that device 000 says can be in its domain can play the song file 456," and the like. Advantageously, a license can be employed to provide a way for the device 000 to specify that some other device can be in its domain, as expressed in the following tenth exemplary license (L10).

Tenth Exemplary License (L10):

```
<license>
    <grant>
        <cm:device cmid="123"/>
        <possessProperty/>
        <cm:myDomain/>
        <validityInterval>
            <notBefore>2002-03-01T00:00:00</notBefore>
            <notAfter>2002-03-15T00:00:00</notAfter>
        </validityInterval>
    </grant>
    <cm:issuerDevice>
        <cm:device cmid="000"/>
    </cm:issuerDevice>
</license>
```

The exemplary license L10 can be similar to the exemplary license L1, except for the bolded portion, wherein the issuer can be device 000, which can certify that the device 123 is in the domain of the device 000 during a specified time interval. For example, the device 123, such as an MP3 player can play the song file 456 during the specified time interval, if the device 000, such as a personal computer can certify that the device 123 is within the domain, such as on the same network of the device 000 during the specified time interval. Advantageously, if the device 123 received the exemplary license L10 from the device 000 during the specified time interval, the device 123 would know that the device 123 could play the song file 456. The exemplary license L9 would probably arrive at the device 123 along with the song file 456. The exemplary license L10, however, would probably arrive via some other means. For example, every time device 123 connects to a home network in device 000 domain, device 000 might send a new or updated exemplary license L10 to the device 123.

The final example is directed to a license enabling the secure identification of entities, so that a security model or trust policy can be put in place, for example, as expressed in the following eleventh exemplary license (L11).

Eleventh Exemplary License (L11):

```
<license>
  <grant>
    <keyHolder>
      <info>
        <dsig:KeyValue>
          <dsig:RSAKeyValue>
            <dsig:Modulus>oRUTUiTQkM.........</dsig:Modulus>
            <dsig:Exponent>AQABAA==</dsig:Exponent>
          </dsig:RSAKeyValue>
        </dsig:KeyValue>
      </info>
    </keyHolder>
    <cx:play/>
    <digitalResource>
      <secureIndirect URI="http://www.xrml.org/.../songs/456">
        <dsig:DigestMethod Algorithm="http://.../xmldsig#sha1"/>
        <dsig:DigestValue>PB4QbKOQCo941tTExbj1/Q==</dsig:DigestValue>
      </secureIndirect>
    </digitalResource>
    <sx:exerciseLimit>
      <sx:stateReference>
        <uddi>
          <serviceKey>
            <uuid>D04951E4-332C-4693-B7DB-D3D1D1C20844</uuid>
          </serviceKey>
        </uddi>
      </sx:stateReference>
    </sx:exerciseLimit>
  </grant>
  <issuer>
    <dsig:Signature>
      <dsig:SignedInfo>
        <dsig:C...14...NMethod Algorithm="http:.../REC-xml-c14n-20010315"/>
        <dsig:SignatureMethod Algorithm="http://.../xmldsig#rsa-sha1"/>
        <dsig:Reference>
          <dsig:Transforms>
            <dsig:Transform Algorithm="http://.../xrml2core#license"/>
          </dsig:Transforms>
          <dsig:DigestMethod Algorithm="http://.../xmldsig#sha1"/>
          <dsig:DigestValue>PB4QbKOQCo941tTEx...</dsig:DigestValue>
        </dsig:Reference>
      </dsig:SignedInfo>
      <dsig:SignatureValue>AYmqOhSHbiP9JadD2...</dsig:SignatureValue>
      <dsig:KeyInfo>
        <dsig:KeyValue>
          <dsig:RSAKeyValue>
            <dsig:Modulus>X0j9q9OAxvhre4NP6q...</dsig:Modulus>
            <dsig:Exponent>AQABAA==</dsig:Exponent>
          </dsig:RSAKeyValue>
        </dsig:KeyValue>
      </dsig:KeyInfo>
    </dsig:Signature>
  </issuer>
</license>
```

The exemplary license L11 can be similar to the exemplary license L2, except for the first through fourth bolded portions, wherein the device identifier 123 can be replaced with a public key identification of the device 123, the song file 456 can be replaced with a cryptographically secure reference to the song file 456 via a hash value, the lookup key 789 on the device 123 can be replaced with a Universal Description, Discovery and Integration (UDDI) service key of an online counter service, the issuer device 024 can be replaced with a public key identification of the issuer and the issuer's signature of the exemplary license L11.

Advantageously, efficient exemplary profiles can be constructed based on the exemplary licenses L1-L11. An exemplary profile, based on the exemplary license L1, referred to as profile B, can be constructed, generated, and the like. A license can be in the exemplary profile B, for example, if the license can be similar the exemplary license L1, with the possible exception of having different cmid values.

For example, the exemplary license L3 would not be in the exemplary profile B, because of the additional cmid values 111 and 333 included in the exemplary license L3, which could not be included in the exemplary profile B. However, a license that the device 123 can issue to devices 111 or 333, for example, pursuant to the exemplary unlimited redistribution license L3, and the like, can be in the exemplary profile B. In this case, the license issued by the device 123 would be similar to the exemplary license L1, except that the issuer device would change from 024 to 123, the playing device 123 would be changed 111 or 333, and the like. Also, trivially, the exemplary license L1 can be in the exemplary profile B.

In a similar manner, an exemplary profile, based on the exemplary license L2, referred to as profile C, can be constructed, generated, and the like. A license can be in the exemplary profile C, for example, if (i) the license can be similar to the exemplary license L2, for example, with the possible exception of having different cmid values corresponding to the cmid values 123, 456, and 024 of the exemplary license L2, (ii) the cmid value of the device on which the count can be kept can be the same as the cmid value of the device that can exercise the right to play the identified song file, and the like.

Figure 2:
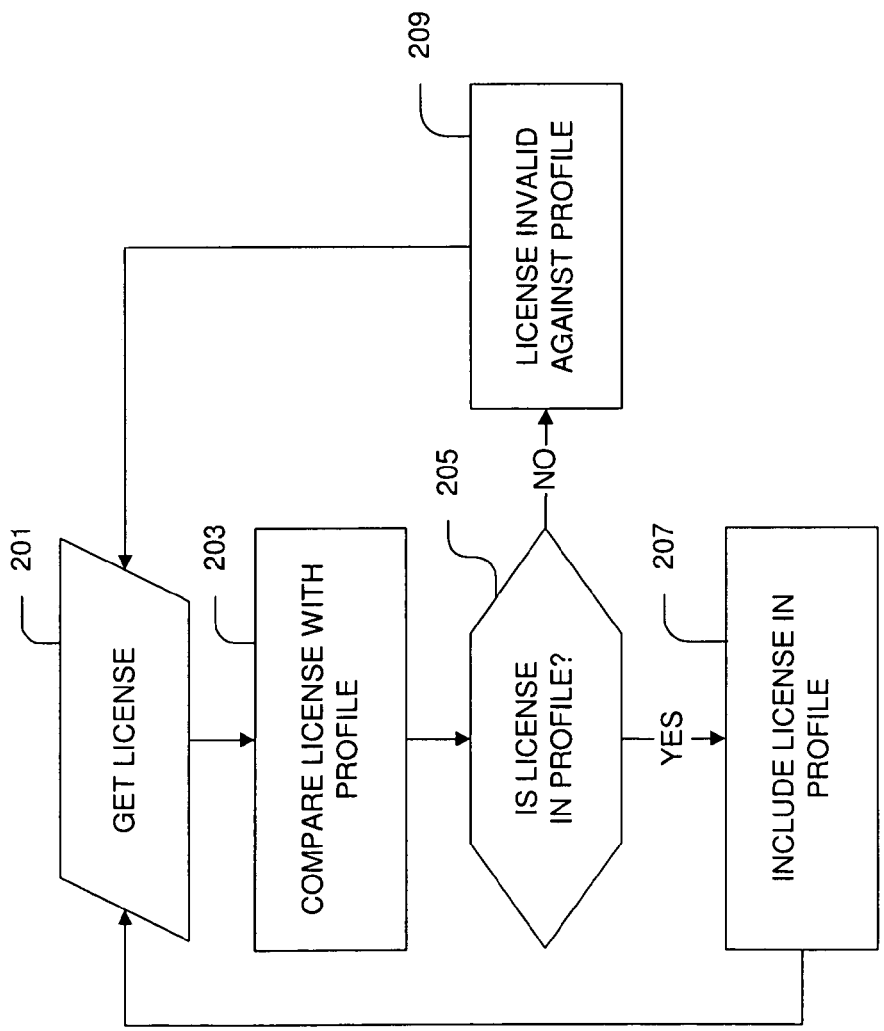
FIG. 2 is a flowchart illustrating an exemplary rights expression profiling process.

FIG. 2 is a flowchart illustrating an exemplary rights expression profiling process. In FIG. 2, at step 201, for example, the profiling process can include obtaining a license. At step 203, for example, the license can be compared against a profile. At step 205, for example, it is determined whether or not the license is in the profile by comparing the license and the profile to determine if the license and the profile are similar except for having different values for one or more corresponding variable values. If the license is determined to be the profile at step 205, the license can be classified as being in the profile at step 207. Otherwise the license can be classified as being invalid against the profile at step 209.

Advantageously, profiling can allow devices, for example, to easily classify their capabilities, and the like. For example, a device that only supports profile B would not support limits related the exercise of the right to play the identified song file, and the like. By contrast, a device that supports profile C could support exercise limits, but only if the state can be kept on the same device.

Profiling, and template mapping can be employed, advantageously, for compression of a rights expression, as illustrated in an exemplary byte table shown in Table 2.

As shown in Table 2, for example, byte 0 can be used for storing information, such as identification numbers for employed algorithms, profiles, or templates, bytes 1-3 can be used for specifying the number x of payload bytes employed for storing compressed or uncompressed data, bytes 4 through x+3 can be used for storing the compressed or uncompressed data, and the like.

According to an exemplary embodiment, an algorithm B for the profile B, or a template T1 based on the profile B, having an identification number associated therewith (for example, 1), can be employed to compress member expressions E down to 12 payload bytes (for example, x=12=4 bytes times three cmid values of the corresponding three expressions), and the like. The exemplary license L1 compressed into such an exemplary bit structure can be illustrated in an exemplary compressed byte table, as shown in Table 3.

TABLE 3

Exemplary Compressed Byte Table.

|  | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| Hex | 01 | 00 | 00 | 0C | 00 | 00 | 00 | 7B | 00 | 00 | 01 | C8 | 00 | 00 | 00 | 18 |
| Decimal | 1 |  | 12 |  |  | 123 |  |  |  | 456 |  |  |  | 24 |  |  |
|  | id |  | x |  |  | cmid 1 |  |  |  | cmid 2 |  |  |  | cmid 3 |  |  |

TABLE 2

Exemplary Byte Table.

| Bytes | Value | Meaning / Compression Algorithm |
|---|---|---|
| 0 | 0x00 | Reserved |
|  | 0x01 | Algorithm B for Profile B |
|  | 0x02 | Algorithm C for Profile C |
|  | 0x03-0xFE | Future Algorithms |
|  | 0xFF | Uncompressed |
| 1-3 |  | Size of (un)compressed data |
| 4 through x + 3 |  | (Un)compressed data |

As shown in Table 3, for example, byte 0 can be used for storing the identification number 1 for the algorithm B for the profile B, or the template T1, bytes 1-3 can be used for storing the number x of payload bytes employed (x=12), and bytes 4 through 15 (x+3) can be used for storing the cmid values 123, 456, and 024 from the exemplary license L1.

According to an exemplary embodiment, an algorithm C for profile C, or a template T2 based on the profile C, having an identification number associated therewith (for example, 2) can be employed to compress any of its member expressions E down to 16 payload bytes (for example, x=14=4 bytes times four cmid values of the corresponding four expressions), and the like. The exemplary license L2 compressed into the exemplary bit structure can be illustrated in an exemplary compressed byte table, as shown in Table 4.

TABLE 4

Exemplary Compressed Byte Table.

|  | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| Hex | 02 | 00 | 00 | 10 | 00 | 00 | 00 | 7B | 00 | 00 | 01 | C8 | 00 | 00 | 03 | 15 |
| Decimal | 2 |  | 16 |  |  | 123 |  |  |  | 456 |  |  |  | 789 |  |  |
|  | id |  | x |  |  | cmid 1 |  |  |  | cmid 2 |  |  |  | cmid 3 |  |  |

|  | 16 | 17 | 18 | 19 |
|---|---|---|---|---|
| Hex | 00 | 00 | 00 | 18 |
| Decimal |  | 24 |  |  |
|  |  | cmid 4 |  |  |

As shown in Table 4, for example, byte 0 can be used for storing the identification number 2 for the algorithm C for profile C, or the template T2, bytes 1-3 can be used for storing the number x of payload bytes employed (x=16), and bytes 4 through 19 (x+3) can be used for storing the cmid values 123, 456, 789, and 024 from the exemplary license L2.

Advantageously, the exemplary bit structure allows for the addition of additional compression algorithms, profiles, or templates, as devices employing the exemplary bit structure gain capabilities, as new algorithms, profiles, and templates are created, generated, derived, determined, and the like. In addition, the exemplary bit structure, advantageously, allows for the transmission and reception of uncompressed or raw data, for example, uncompressed or raw rights expressions.

The exemplary profile B or template T1, can include three variables that can be used to split the exemplary license L1 into four parts B1-B4, as illustrated in an exemplary profile or template table, as shown in Table 5.

TABLE 5

Exemplary Profile or Template.

| Resource String Name | Value |
|---|---|
| B1 | \<license\><br>  \<grant\><br>    \<cm:device cmid=" |
| B2 | "/\><br>    \<cx:play/\><br>    \<cm:song cmid=" |
| B3 | "/\><br>  \</grant\><br>  \<cm:issuerDevice\><br>    \<cm:device cmid=" |
| B4 | "/\><br>  \</cm:issuerDevice\><br>\</license\> |

Advantageously, the parts B1-B4 can be stored as resource strings within a device, such as a resource-constrained device, to send and receive uncompressed or raw data, such uncompressed or raw rights expressions. A profile B device, such as a resource-constrained device, can receive a raw or uncompressed data string W, such as a raw or uncompressed rights expression string, corresponding to the exemplary profile B or template T1.

The profile B device can be configured to call, invoke, execute, and the like, a first exemplary function, as illustrated in Table 6 and in pseudo-code below. Advantageously, the first exemplary function can be employed to determine if the profile B device can play a song, and the like.

TABLE 6

First Exemplary Function.

| Item | Name | Description |
|---|---|---|
| Function | interpretXrML_B | Determines if a profile B device can play a song. |
| Input | W | The raw XrML. |
| Input | deviceId | The device's id. |
| Input | songId | The song's id. |
| Output | result | ERROR 1, if the license is not in profile B.<br>ERROR 2, if the device is incorrect.<br>ERROR 3, if the song does not match.<br>Otherwise, result is non-error representing the issuer device's id. It is the caller's |

TABLE 6-continued

First Exemplary Function.

| Item | Name | Description |
|---|---|---|
| | | responsibility to verify that the issuer device is trustworthy. |

First Exemplary Function in Pseudo-Code with Uncompressed Date W:

```
Function interpretXrML_B(W, deviceId, songId) {
    Read through W comparing to B1
    If mismatch before end of B1 then ERROR 1
    Read integer from W into temp until reaching end of numbers
    If temp does not equal deviceId then ERROR 2
    Read through W comparing to B2
    If mismatch before end of B2 then ERROR 1
    Read integer from W into temp until reaching end of numbers
    If temp does not equal songId then ERROR 3
    Read through W comparing to B3
    If mismatch before end of B3 then ERROR 1
    Read integer from W into temp until reaching end of numbers
    Set result = temp
    Read through W comparing to B4
    If mismatch before end of B4 then ERROR 1
    Success. Return result.
}
```

Advantageously, the performance of the first exemplary function can be optimized, when operating on a compressed data string w, as illustrated below.

First Exemplary Function in Pseudo-Code with Compressed Data w:

```
Function interpretXrML_B(w, deviceId, songId) {
    algorithm = readBytes(w, 1);
    size = readBytes(w, 3);
    if(algorithm != 1 OR size != 12) {
        skipBytes(w, size);
        ERROR 1;
    }
    if(deviceId != readBytes(w, 4)) {
        skipBytes(w, 8);
        ERROR 2;
    }
    if(songId != readBytes(w, 4)) {
        skipBytes(w, 4);
        ERROR 3;
    }
    result = readBytes(w, 4);
    return result;
}
```

The encoding of a rights expression, such as a license, can include converting the rights expression from a native form, such as XrML, into the template or profile counterpart of the license that can be employed on a resource-constrained device. An approach to perform such encoding can be referred to as explicit encoding, which typically works best when the original license can be almost identical to the template or profile counterpart of the license.

Figure 3:
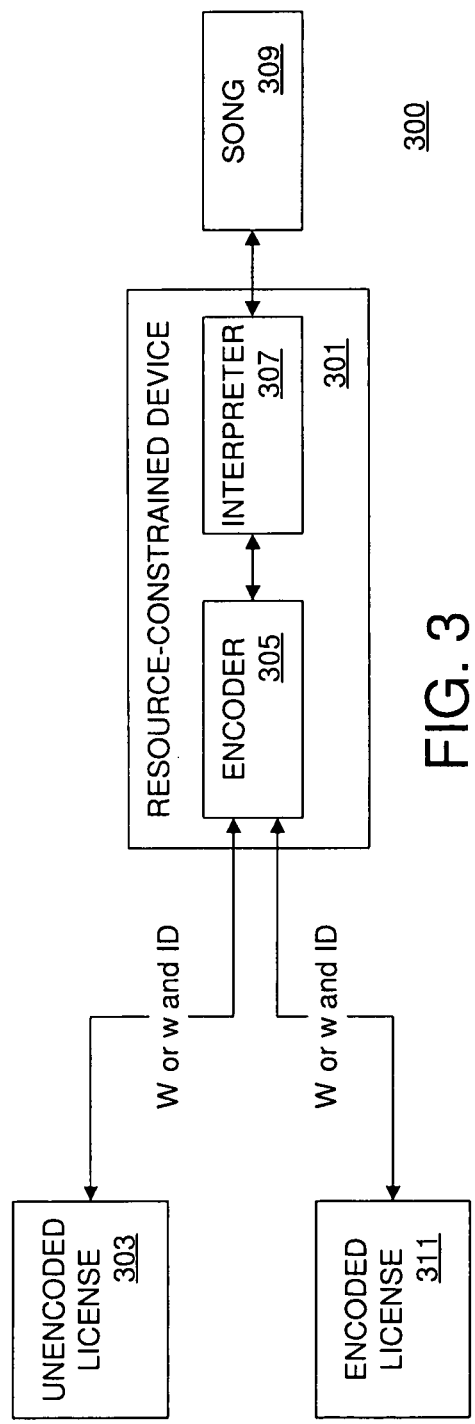
FIG. 3 illustrates an exemplary rights expression encoding and decoding sub-system for resource-constrained devices in the Digital Rights Management system of FIG. 1.

FIG. 3 illustrates an exemplary rights expression encoding and decoding sub-system 300 for resource-constrained devices in the Digital Rights Management system of FIG. 1. In the sub-system of FIG. 3, for example, high-end resources, such as an XrML parser, an XrML interpreter need not be employed for explicit encoding on a resource-constrained device. For example, a device 301 can receive an un-encoded license 303, and instead of parsing the license 303, for example, because of resource constraints, and the like, can employ an explicit encoder 305 to encode the license 303 into a form that the device 301 can later process, advantageously, without having to employ a general-purpose interpreter, and the like, but rather an interpreter 307, such as resource-constrained, or less than full-featured interpreter.

The template T1 or the profile B corresponding to the first exemplary license L1, as shown below, can be generated by removing parameters, values or data that are most likely to change from one instantiation of the exemplary license L1 to another, such as the values for the cmid variables.

Exemplary Template T1 or Profile B:

```
<license>
  <grant>
    <cm:device cmid= ""/>
    <cx:play/>
    <cm:song cmid= ""/>
  </grant>
  <cm:issuerDevice>
    <cm:device cmid= ""/>
  </cm:issuerDevice>
</license>
```

The exemplary template T1 or profile B can be in the form an XrML-based template, profile, and the like. The exemplary template T1, or profile B, can be used, for example, to represent a license that can permit a particular device the right to play a particular song, that can reference a device that can issue the exemplary license L1, and the like.

The exemplary template T1, or profile B, can include the three variable elements that split the exemplary license L1 into the four parts B1-B4, as shown in Table 5. Advantageously, the parts B1-B4 can be stored as resource strings within the device 301 to enable the device 301 to send, and receive the un-encoded license 303, for example, raw or uncompressed rights expressions (W).

If the device 301 can receive a raw XrML string W, the device 301 can call the first exemplary function to determine if the device 301 can exercise a usage right specifying a manner of use, such as playing a song 309. In a similar manner, the device 301 can call a second exemplary function, as shown in Table 7 and in pseudo-code below, to generate an encoded license 311, such as the exemplary license L1. The first exemplary function can be included as part of the interpreter 307 functionality, and the second exemplary function can be included as part of the encoder 305 functionality.

TABLE 7

Second Exemplary Function.

| Item | Name | Description |
| --- | --- | --- |
| Function | EncodeXrML_T1 | Determines if a profile B device can encode a license. |
| Input | W | The raw XrML. |
| Input | deviceId | The device's id. |
| Input | songId | The song's id. |
| Output | result | ERROR 1, if the license is not a T1. Encoded T1. |

Second Exemplary Function in Pseudo-Code:

```
Function EncodeXrML_T1(W,deviceId, songId) {
  Read through W comparing to B1
  If mismatch before end of B1 then ERROR 1
  Read integer from W into temp until reaching end of numbers
  Read through W comparing to B2
  If mismatch before end of B2 then ERROR 1
  Read integer from W into temp until reaching end of numbers
  Read through W comparing to B3
  If mismatch before end of B3 then ERROR 1
  Read integer from W into temp until reaching end of numbers
  Read through W comparing to B4
  If mismatch before end of B4 then ERROR 1
  Success. Return the variables from L1.
}
```

If the exemplary license L1 can be in the profile B of the device 301, as described in T1, then the exemplary license L1 can be encoded by the encoder 305 in an encoded license table by the device 301, for example, as shown in Table 8, and the like.

TABLE 8

Exemplary Encoded License.

| | 0 | 1 | 2 | 3 | 4 | 5 | 6 | 7 | 8 | 9 | 10 | 11 | 12 |
| --- | --- | --- | --- | --- | --- | --- | --- | --- | --- | --- | --- | --- | --- |
| Hex | 01 | 00 | 00 | 00 | 7B | 00 | 00 | 01 | C8 | 00 | 00 | 00 | 18 |
| Decimal | 1 | | | 123 | | | | 456 | | | | 24 | |
| | id | | | cmid 1 | | | | cmid 2 | | | | cmid 3 | |

In Table 8, the corresponding 12-byte representation can be interpreted by the device 301, for example, to mean "use a template with identification number 1, fill in the first 3 variables with the values 123, 456, and 024" to generate the license 311. Advantageously, the encoded license 311, for example, corresponding to exemplary license L1, can be extremely compact, by only having to reference a template, or profile, and associated variables thereof, decreasing transmission costs, and storage costs of the exemplary license L1.

Figure 4:
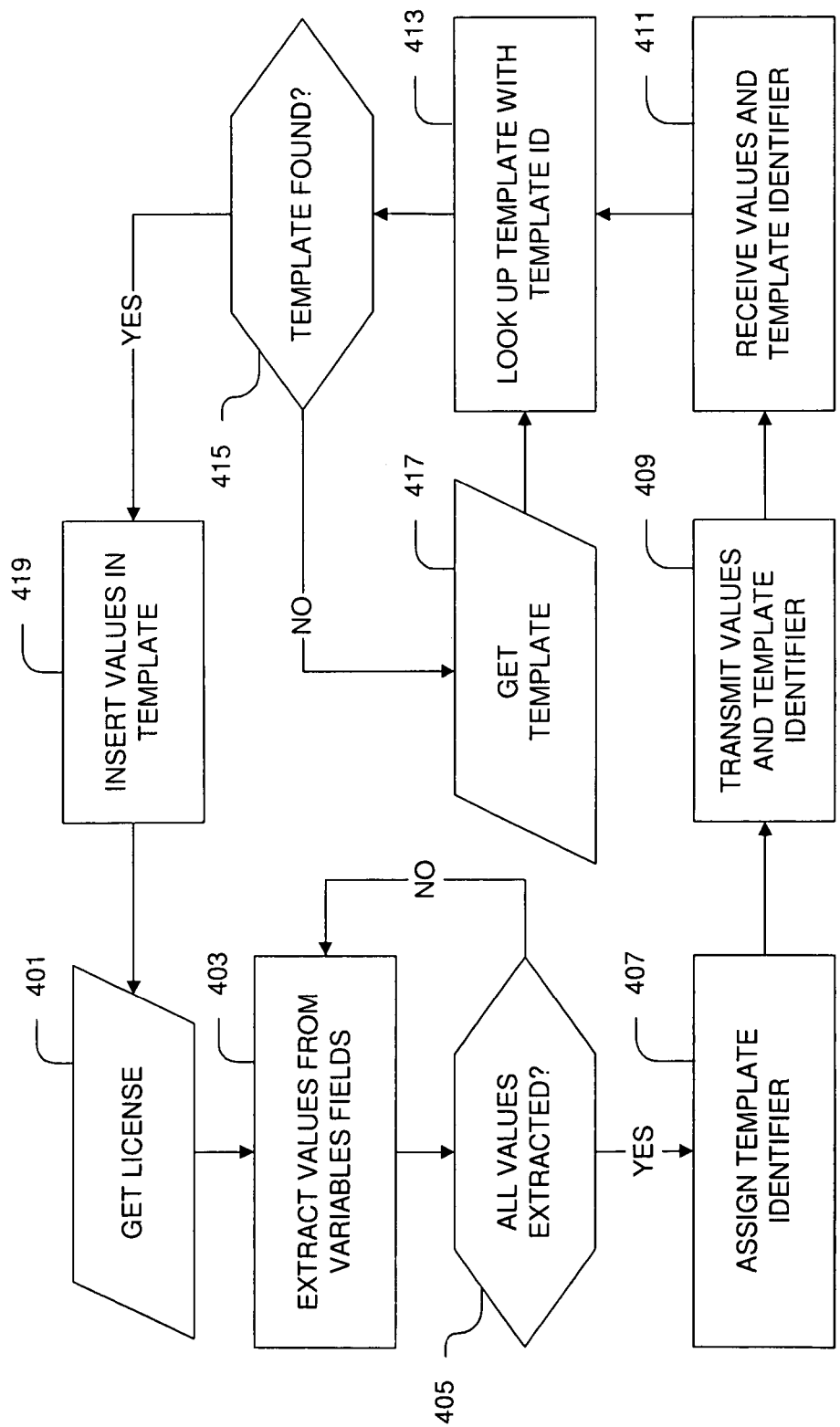
FIG. 4 is a flowchart illustrating the exemplary rights expression encoding and decoding process of FIG. 3.

FIG. 4 is a flowchart illustrating the exemplary rights expression encoding and decoding process of FIG. 3. In FIG. 4, at step 401, for example, the encoding process can include obtaining a license. At step 403, for example, one or more values from variables fields of the license can be extracted until the employed values are removed from the license, as determined at step 405, to generate the template corresponding to the license. At step 407, for example, a template identifier can be assigned, and at step 409 the extracted values and the template identifier can be transmitted as the encoded license.

At step 411, for example, the decoding process can include receiving the template identifier along with the extracted values, and step 413 looking up a template corresponding to the template identifier, as determined at step 415. If no corresponding template can be found, step 417 can be employed to obtain a template corresponding to the template identifier, for example from an exemplary templatespace service, as later described. Once a template corresponding to the template identifier is obtained, at step 419 the received values can be inserted into the template corresponding to the template identifier to reconstruct the original license, advantageously, in a lossless manner.

The present invention includes recognition, for example, that not all licenses can be mapped explicitly into a template, or profile that a particular device, such as a slave device, can support. Advantageously, a trusted master device can interpret the license, find a mapping between the interpreted rights expressions and the set of templates that the slave device supports, and issue the resulting template to the slave device.

Figure 5:
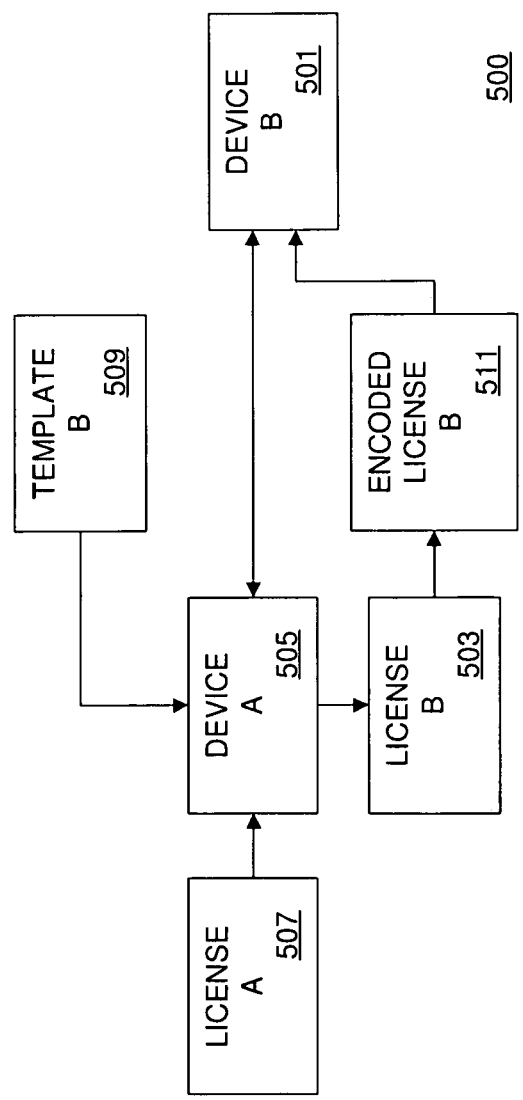
FIG. 5 illustrates an exemplary rights expression template mapping sub-system in the Digital Rights Management system of FIG. 1.

For example, FIG. 5 illustrates an exemplary rights expression template mapping sub-system 500 in the Digital Rights Management system of FIG. 1. In FIG. 5, for example, a license A (507) can grant the right to play a piece of content indefinitely within a specific home domain, such as the domain of a device A (505). However, a device B (501) can only support license template B (509), wherein device B (501) can play content between dates D1 to D2, such as given by the template B (509).

Typically, it would not be possible for device B (501), in this case the slave device, to interpret the license A (507), because the license A (507), for example, does not include the syntax, semantics of "playing between dates D1 and D2." A user could employ another trusted device, such as the device A (505), in this case the master device, in the home domain for interpreting a wide variety of licenses, such as the license A (507). However, in further exemplary embodiment, the device A (505) can interact with the device B (501), for example, to get a list of templates that device B (501) supports, such as the template B (509), and the like.

In further exemplary embodiment, the device A (505) can establish a knowledge database including a list of templates that device B (501) can support, via other methods, such as configuration, and registration mechanisms. However, if the device A (505), for example, can be capable of interpreting the template B (509), and the license A (507), the device A (505) can issue a license B (503) to the device B (501), because a license based on template B (509) can be considered to include a subset of rights that can be issued in the license A (507). Advantageously, the license B (503) can be based on the template B (509), and can be explicitly encoded to generate a corresponding encoded license B (511) that the device B (501) can interpret. Accordingly, a general license, such as the license A (507), can be template mapped to devices, such as the device B (501), for example, which are resource-constrained by being able to interpret a limited amount of templates, or profiles.

Figure 6:
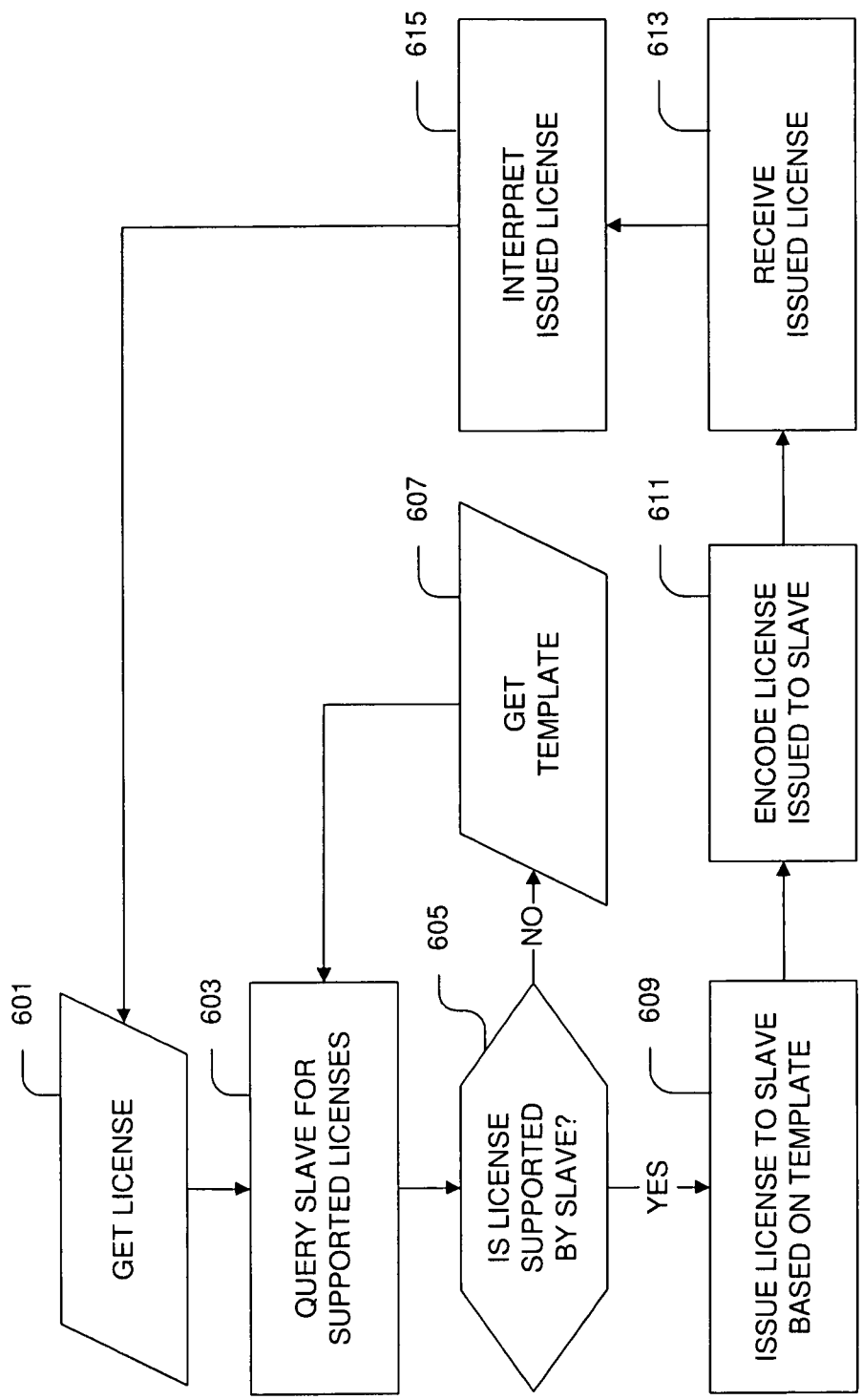
FIG. 6 is a flowchart illustrating exemplary template mapping processes of the sub-system of FIG. 5.

Accordingly, FIG. 6 is a flowchart illustrating exemplary template mapping processes of the sub-system of FIG. 5. In FIG. 6, at step 601, for example, a domain license can be obtained granting a home domain, such as a home computer network, an unlimited right to play, view, render or execute, a piece of identified content, such as a music file, movie file, image file or software file. The user can then requests, for example, from a master device, such as a personal computer on the home network, that the content associated with the domain license be played on a resource-constrained device, such as an MP3 player.

According, at step 603, for example, the master device can query the slave device to determine the types of licenses, profiles, or templates that the slave device can support. At step 605, for example, the master device can determine that the slave device can not support the domain license, and, at step 607, for example, can retrieve a template corresponding to a license that the slave device can support, for example, from a template service, or from the slave device itself.

At step 609, for example, the master device can issue a license that the slave device can support, based on the retrieved template. Advantageously, the slave device need not be capable of interpreting the domain license, but rather can be capable of interpreting the license issued at step 609. Advantageously, the issued license can include a subset of the rights specified in the domain license.

At step 611, for example, the master device, the slave device, or another device, can be used to encode the license in any suitable manner, for example, as described with respect the exemplary embodiments. At step 613, the slave can receive a simple to interpret encoded license, which the slave can interpret at step 615 in any suitable manner, such as described with respect the exemplary embodiments.

Advantageously, the exemplary form of compression, and decompression of the described exemplary embodiments can be a considered lossless, allowing for the slave device to copy, reconstruct, regenerate, or duplicate the issued license from the encoded form thereof by replacing one or more of the values for the variables into a stored copy of the template, or profile. Thus, by employing an encoded license, an associated template, or profile, the encoding process can be reversed so that the original license, advantageously, can be reconstructed from the encoded form thereof.

The exemplary encoding, and decoding processes, advantageously, can be employed with digital signatures to validate, authenticate or ensure that an issued license has not been tampered with, hacked or compromised. For example, the value for a digital signature can be a variable employed with an encoded form of a license.

Figure 7:
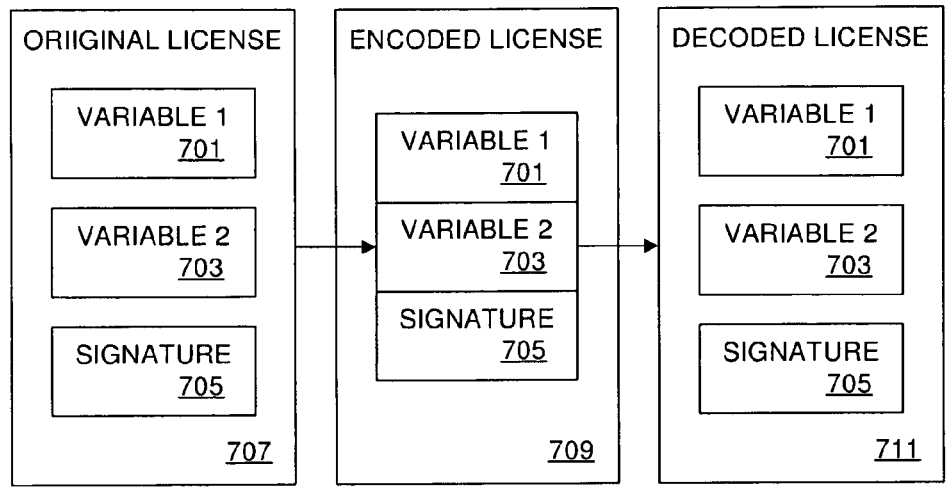
FIG. 7 further illustrates the exemplary rights expression encoding and decoding sub-system FIG. 3 based on a license signature value.

FIG. 7 further illustrates the exemplary rights expression encoding and decoding sub-system FIG. 3, based on such a license signature value 705. In FIG. 7, for example, a signature value 705 can be employed along with one or more values 701-703, as values for variables corresponding to a template or profile that can be extracted from a license 707, such the exemplary license L11.

Advantageously, the license 707 can be encoded by transmitting the values 701-703 in the form of an encoded license 709 that can be delivered, to example, to a resource-constrained device. The values 701-703 can be used to populate the corresponding variables in a stored copy of a template, or profile to generate a decoded license 711. Advantageously, the signature value 705 can be restored into the corresponding variable fields of the corresponding template, profile, and the like, signature validation, authentication, and the like, techniques can be employed with the decoded license 711, such as according to the described exemplary embodiments, and the like.

The exemplary signature technique, advantageously, can employed with a resource-constrained device that can encode the license 709, but may lack facilities, sign, or re-sign the encoded license 709, for example, because such device may not be part of a trust domain, or may not have sophisticated processing capabilities. In a further exemplary embodiment, however, an encoded form of a license can be signed, for example, using any suitable digital signature technique, such as according to the described exemplary embodiments.

Figure 8:
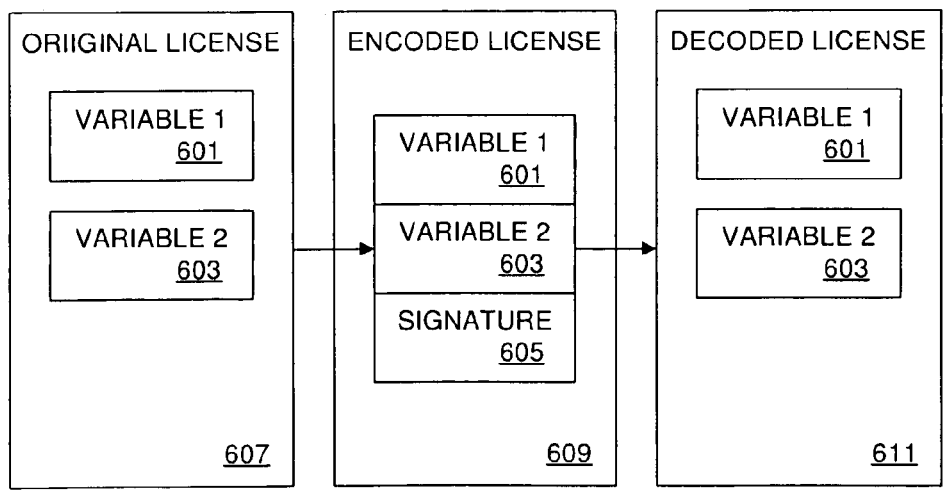
FIG. 8 further illustrates the exemplary rights expression encoding and decoding sub-system FIG. 3 based a signature value for license variables.

For example, FIG. 8 further illustrates the exemplary rights expression encoding and decoding sub-system FIG. 3 based on a signature value 805 for license variables 801-803. In FIG. 8, for example, if a device that can perform the exemplary encoding processes can be part of a trust domain, such a device convert an original license 807 to the encoded form 809, sign the encoded form of the license 809, and transmit the signature value 805 along with the variables 801-803.

Advantageously, the signature value 805 can be employed to validate, authenticate, or ensure that the variables 801-803 are not tampered with, hacked, or compromised. Thus, the integrity, and validity of template identifiers, profile identifiers, and values for variables that can correspond to a template, or profile can be ensured, and trusted.

Based on which of the exemplary signature approaches can be employed, the signature value can used validate encoded or decoded forms of a license. In addition, the exemplary template mapping can occur during interpretation, by employing templates as a profiling technique, and a rights language interpreter employed need not be a feature-rich language parser, or interpreter. For example, the interpretation of the meaning of a license can occur, be predetermined, pre-built, or pre-designed in the corresponding device, such as a resource-constrained.

Thus, advantageously, when a device receives a license, the device can integrate a meaning of the license, along with the variables included in the license. For example, an encoded template or profile, advantageously, can be interpreted, based on the following pseudo-code fragment:

```
Function interpretXrML_B(w, songId) {
   TemplateNumber=Readbytes (w, 1)
   LicDeviceID=Readbytes (w, 4)
   LicSongID=Readbytes (w, 4)
   if(TemplateNumber!= 1) {
      return(NO_PERMISSION_PLAY)
   }
   if(LicDeviceID!= THISDEVICEID) {
      return(NO_PERMISSION_PLAY)
   }
   if(lLicSongID!= songID) {
      return(NO_PERMISSION_PLAY)
   }
   return (YES_PERMISSION_PLAY)
```

Advantageously, such an exemplary form of interpretation can rely on a developer to match an understanding of what can be described in a template, or profile to whatever functions a device can carry out. Accordingly, a rights language can be employed as a common point of understanding between a resource-constrained device that can understand its templates or profiles, a developer of such a device, a license issuer, and an encoding device, which can be mapping licenses to the predetermined templates or profiles.

Other exemplary technologies can be provided, advantageously, to supplement or enhance the exemplary template mapping or profiling, and to facilitate effective managed content distribution to resource-constrained devices. An exemplary templatespace can be employed to allow a license encoded via the exemplary template mapping to specify which template can be associated therewith.

For example, if an encoded license simply specifies "use template 1," the meaning of "template 1" can be ambiguous. Advantageously, the exemplary templatespace can be a namespace that provides context for the integer "1" in the noted expression. In this way, instead of simply encoding the license with a series, such as "1," "123," "456," "24," as shown in Table 8, where "1" can be the template identifier, and "123," "456," and "024" can be the values for the variables, the license can be encoded as "Acme.1," "123," "456," "024."

Advantageously, Acme.1 can reference a namespace from which "1" could derive concise meaning. For example, Acme Corporation could create a series of well-defined products that its product line would support. A device that would receive the templatespace-encoded license, for example, could then identify the appropriate template by accessing a database associated with "Acme" and then the device could index into the database via the integer 1.

The exemplary templatespaces, thus, advantageously, allow templates to be retrieved, stored, managed and accessed, in an unambiguous and scalable fashion. Exemplary templatespaces could thus include: Acme Inc., Acme Cameras, Acme PVR Model 123, bios version 1.3, Personal Video Recorder Makers of Europe, acmetemplates.com, and the like. Advantageously, as makers of resource-constrained devices adopt content that can be distributed with a rights language, standardized sets of templates that are viable for respective product spaces can be deployed.

Templatespaces themselves may not fully address the issue of template lifecycles. Advantageously, however, templatespace services can be deployed. For example, a templatespace service can include a service that manages the templates themselves, so that the templates can be retrieved later by devices that are performing the exemplary template mapping, and by systems that wish to decode a license back to an original form thereof. The templatespace service can also provide other functions, such as query for templates offered by a given company, support for revisions and updates to the templates and/or mapping thereof to licenses.

Advantageously, a templatespace service can be deployed, via a number of methodologies, for example, including a computer network based service, such as a website, a service built into a resource-constrained device, and the like. For example, FIG. 9 illustrates an exemplary templatespace service 900 that can be deployed via a number of methodologies, for example, including a computer network-based service, such as a website or a service built into a resource-constrained device.

Figure 9:
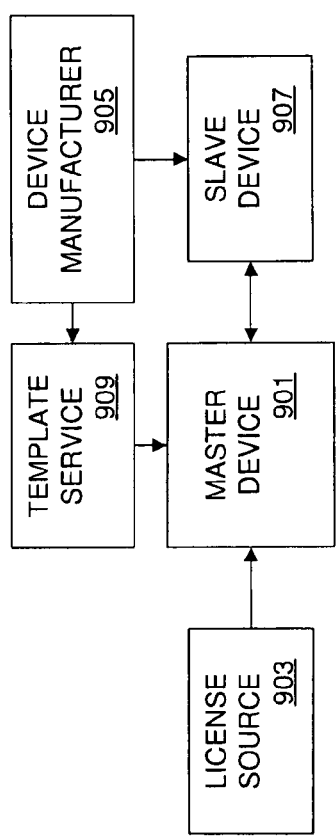
FIG. 9 illustrates an exemplary template space for resource-constrained devices in the Digital Rights Management system of FIG. 1.

In FIG. 9, a user can acquire content bound by a rich rights language on master device 901, such as a personal computer, via a license source 903. The user can receive as an update from a device manufacturer 905, a new bios, for a slave device 907, such as a handheld mobile mp3 player, that allows the user to properly treat the content with a new license template, such as a "play only during date a-b" type of template of the exemplary embodiments. For example, the new bios could support a number of new templates on the slave device 907.

The device manufacturer can make templates available via a template service 909, such as a publicly accessible network service, and the like. When the user moves the content to the slave device 907, based on information from the slave device 907, the master device 901 can acquire a list of templates supported by the slave device 907 from the template service 909. The master device 901 can interpret the rights language from the templatespace network service 909, and determine that the new template supported can be appropriate for transferring the content from the master device 901 to the slave device 907. The master device 901 then can encode and issue a new license to the slave device 907 based on the exemplary license encoding techniques.

In a further exemplary embodiment, a similar flow and rights lifecycle can be accomplished, but instead, wherein the manufacturer 905 makes the templates available on the slave device 907 itself. In addition, legacy devices or devices that have little or no support for DRM can employ an industry-created generic template that describes the behavior of such device. Advantageously, the legacy device would not receive a rights language of any form, but rather would treat content the same regardless of the source.

For example, a digital television can employ a standard rights template created to represents "digital televisions." Manufactures of digital televisions then could agree to the terms expressed in such a template and develop products that constrain their content usage rules to such a template.

Advantageously, a master device can interpret a license and control content delivery to such device only when the usage rights can be granted.

In an exemplary embodiment, a symbolic representation can be employed to encode, and the like, a rights expression, in a form or a template or profile, for example, as shown in Tables 3, 5, and 8. A symbolic representation can include a graphical representation based on glyphs, a modulated or varied signal-based representation, such as based on modulated or varied light or sound signals. Thus, the symbolic representation of a template or profile can be encoded, derived, and the like, based on glyph structures, such star-shaped structures, square-shaped structures, rectangular-shaped structures, circular-shaped structures, triangular-shaped structures or portions thereof, and the like. In a similar manner, a template or profile can be encoded, derived, and the like, based on modulated or varied signals, lights, sounds, series of sounds, light pulses, using at any suitable frequency, amplitude, including ultraviolet waves, x-rays, microwaves, radio waves, employing lasers, modulated or convoluted information, different colors or wavelengths, and electric or magnetic field variations.

Figure 10:
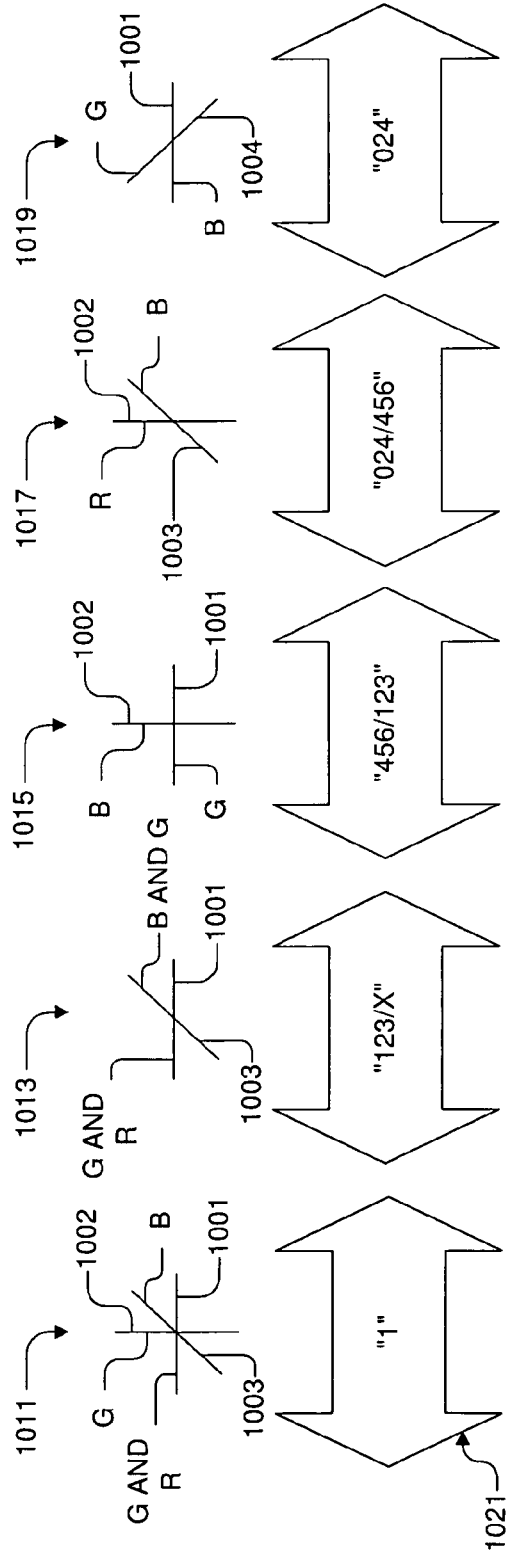
FIG. 10 illustrates an exemplary symbolic representation of a rights expression including a profile or template that can be generated by the Digital Rights Management system of FIG. 1.

For example, FIG. 10 illustrates an exemplary symbolic representation of the templates or profiles corresponding to Tables 3, 5, or 8. In FIG. 10, for example, an exemplary symbolic representation can be derived from a glyph structure, for example, based on a star-shaped structure, and the like, and can be used for expressing the templates or profiles corresponding to Tables 3, 5, or 8. In an exemplary embodiment, the symbols 1001-1004 derived from the star-shaped structure can be taken from the Red, Green, and Blue (RGB) color space. Thus, the symbols 1001-1004 of the star-shaped structure can include the Red (R), Green (G), and/or Blue (B) colors. Accordingly, in a basic case, wherein no colors can be combined, 12 symbols can be generated (for example, four symbols times three colors). To increase the number of members or symbols, however, complex symbols 1011-1019 having overlapping colors can be generated, as shown in FIG. 10.

Thus, two or more symbols of different colors, for example, up to all 12 symbols, can be combined so as to overlap on a physical location, to potentially produce part or all of the star-shaped structure in different colors or combination of colors for each part of the star shape. For example, the color of the resulting horizontal symbol 1001 of the complex symbol 1011 can be based on the combination of Green and Red symbols 1001. In this way, the symbols 1001-1004, in various color combinations, can be used to generate the complex symbols 1011-1019, as shown in FIG. 10.

Accordingly, the number of complex symbols in the exemplary symbol set illustrated by FIG. 10, for example, can be $(2^{12}-1)$ or 4095 symbols, assuming that a blank space is not considered a symbol. Advantageously, with the numerous choices for the complex symbols provided by the exemplary embodiment, correspondingly complex and comprehensive symbolic representations of information, such as information for grammar, language, and the like, for a rights expressions can be generated.

For example, as shown in FIG. 10, the exemplary rights expression 1021 can indicate the templates or profiles corresponding to Tables 3, 5, or 8. In FIG. 10, for example, the symbols 1011-1019 can be used to express the template or profile identification "1" followed the first cmid value "123" of the template or the number of pay load bytes "x" of the profile; followed by the second cmid value "456" of the template or the first cmid value "123" of the profile; followed by the third and final cmid value "024" of the template or the second cmid value "456" of the profile; followed by the third and final cmid "024" of the profile. In this manner, symbols can be generated and transmitted so as to represent templates or profiles corresponding to Tables 3, 5, or 8.

In an exemplary embodiment, the glyphs, symbols, words, messages, and the like, of the exemplary embodiments used to convey information, for example, about a rights expression, can be encoded using light, sound, a series of sounds, light pulses, and the like, using at any suitable frequency, amplitude, and the like, can include ultraviolet waves, x-rays, microwaves, radio waves, and the like, can employ lasers, modulated or convoluted information, different colors or wavelengths, electric or magnetic field variations, and the like.

In an exemplary embodiment, any suitable series of the glyphs, symbols, words, messages, and the like, of the exemplary embodiments employed can have its own grammar, rules, and the like, which provide a meaning to a transmitted message. For example, a sound or light in a range of frequencies that a human ear or eye cannot detect, can be employed for transmitting the glyphs, symbols, words, messages, and the like, of the exemplary embodiments, during security applications, privacy applications, and the like. In this way, a transmitted message can be made transparent to a user or users, but at the same can be retrieved, understood, and the like, by a suitable sensor, detector, and the like. In an exemplary embodiment, the glyphs, symbols, words, messages, and the like, of the exemplary embodiments can be expressed using any suitable human or machine sensing organ or device, and the like, so long as that the sensed information, message, and the like, can be quantized, digitized, expressed, and the like, based on numbers, bits, bytes, and the like.

The devices and subsystems of the Digital Rights Management system 100, for example, as described with respect to FIGS. 1-10, can communicate, for example, over a communications network 170, and can include, for example, any suitable servers, workstations, personal computers (PCs), laptop computers, PDAs, Internet appliances, set top boxes, modems, handheld devices, telephones, cellular telephones, wireless devices, other devices, and the like, capable of performing the processes of the disclosed exemplary embodiments. The devices and subsystems of the Digital Rights Management system 100, for example, can communicate with each other using any suitable protocol and can be implemented using a general purpose computer system. One or more interface mechanisms can be used in the Digital Rights Management system 100 including, for example, Internet access, telecommunications in any suitable form, such as voice, modem, and the like, wireless communications media, and the like. Accordingly, communications network 170 can include, for example, wireless communications networks, cellular communications networks, satellite communications networks, Public Switched Telephone Networks (PSTNs), Packet Data Networks (PDNs), the Internet, intranets, hybrid communications networks, combinations thereof, and the like. In addition, the communications network 170 can be the same or different networks.

As noted above, it is to be understood that the Digital Rights Management system 100, for example, as described with respect to FIGS. 1-10, is for exemplary purposes, as many variations of the specific hardware used to implement the disclosed exemplary embodiments are possible. For example, the functionality of the devices and the subsystems of the Digital Rights Management system 100 can be implemented via one or more programmed computer systems or devices. To implement such variations as well as other variations, a single computer system can be programmed to perform the special purpose functions of one or more of the devices and subsystems of the Digital Rights Management system 100. On the other hand, two or more programmed computer systems or devices can be substituted for any one of the devices and subsystems of the Digital Rights Management system 100. Accordingly, principles and advantages of distributed processing, such as redundancy, replication, and the like, also can be implemented, as desired, for example, to increase the robustness and performance of the Digital Rights Management system 100.

The Digital Rights Management system 100, for example, as described with respect to FIGS. 1-10, can be used to store information relating to various processes described herein. This information can be stored in one or more memories, such as a hard disk, optical disk, magneto-optical disk, RAM, and the like, of the devices and sub-systems of Digital Rights Management system 100. One or more databases of the devices and subsystems of the Digital Rights Management system 100 can store the information used to implement the exemplary embodiments. The databases can be organized using data structures, such as records, tables, arrays, fields, graphs, trees, lists, and the like, included in one or more memories, such as the memories listed above.

All or a portion of the Digital Rights Management system 100, for example, as described with respect to FIGS. 1-10, can be conveniently implemented using one or more general purpose computer systems, microprocessors, digital signal processors, micro-controllers, and the like, programmed according to the teachings of the disclosed exemplary embodiments. Appropriate software can be readily prepared by programmers of ordinary skill based on the teachings of the disclosed exemplary embodiments. In addition, the Digital Rights Management system 100 can be implemented by the preparation of application-specific integrated circuits or by interconnecting an appropriate network of component circuits.

Advantageously, the exemplary embodiments described herein can be employed in offline systems, online systems, and the like, and in applications, such as TV applications, computer applications, DVD applications, VCR applications, appliance applications, CD player applications, and the like. In addition, the signals employed to transmit the glyphs, symbols, words, messages, profiles, templates, and the like, of the exemplary embodiments, can be configured to be transmitted within the visible spectrum of a human, within the audible spectrum of a human, not within the visible spectrum of a human, not within the audible spectrum of a human, combinations thereof, and the like.

Although the exemplary embodiments are described in terms of items, such as music files, audio files, and the like, the exemplary embodiments are applicable to any suitable items, such as digital content, devices, software, services, goods, resources, and the like, and can be practiced with variations in technology, interface, language, grammar, content, rights, offerings, services, speed, size, limitations, devices, and the like.

While the present invention have been described in connection with a number of embodiments and implementations, the present invention is not so limited but rather covers various modifications and equivalent arrangements, which fall within the purview of the appended claims.

APPENDIX

Sample Extension Schema (schema/2001/11/compactMusic):

```
<?xml version="1.0" encoding="UTF-8"?>
<!-- Copyright (C) 2001 ContentGuard Holdings, Inc. All rights reserved. "ContentGuard" is a
registered trademark and "XrML", "eXtensible rights Markup Language", the XrML logo, and the
ContentGuard logo are trademarks of ContentGuard Holdings, Inc. All other trademarks are
properties of their respective owners. -->
<!-- NOTE: This is an example extension schema. It is not part of XrML 2.0 Specification. -->
<xsd:schema targetNamespace="http://www.xrml.org/schema/2001/11/compactMusic"
xmlns:xsd="http://www.w3.org/2001/XMLSchema"
xmlns:sx="http://www.xrml.org/schema/2001/11/xrml2sx"
xmlns:r="http://www.xrml.org/schema/2001/11/xrml2core"
xmlns:cx="http://www.xrml.org/schema/2001/11/xrml2cx"
xmlns:cm="http://www.xrml.org/schema/2001/11/compactMusic" elementFormDefault="qualified"
attributeFormDefault="unqualified">
  <xsd:import namespace="http://www.xrml.org/schema/2001/11/xrml2cx"
schemaLocation="xrml2cx.xsd"/>
  <!-- - Principals-->
  <xsd:element name="device" substitutionGroup="r:principal">
    <xsd:complexType>
      <xsd:complexContent>
        <xsd:extension base="r:Principal">
          <xsd:attribute name="cmid" type="xsd:int" use="optional"/>
        </xsd:extension>
      </xsd:complexContent>
    </xsd:complexType>
  </xsd:element>
  <!-- - Resources-->
  <xsd:element name="song" substitutionGroup="r:resource">
    <xsd:complexType>
      <xsd:complexContent>
        <xsd:extension base="r:Resource">
          <xsd:attribute name="cmid" type="xsd:int" use="optional"/>
        </xsd:extension>
      </xsd:complexContent>
    </xsd:complexType>
  </xsd:element>
  <!-- - Property Resources-->
  <xsd:element name="myDomain" substitutionGroup="r:resource">
```

APPENDIX-continued

Sample Extension Schema (schema/2001/11/compactMusic):

```
    <xsd:complexType>
      <xsd:complexContent>
        <xsd:extension base="r:Resource"/>
      </xsd:complexContent>
    </xsd:complexType>
  </xsd:element>
  <!-- - Conditions-->
  <xsd:element name="copyManagement" type="sx:StatefulCondition"
substitutionGroup="r:condition"/>
  <!-- - Issuer Descriptions-->
  <xsd:element name="issuerDevice">
    <xsd:complexType>
      <xsd:complexContent>
        <xsd:extension base="cm:IssuerRaw">
          <xsd:sequence minOccurs="0">
            <xsd:element ref="cm:device"/>
          </xsd:sequence>
        </xsd:extension>
      </xsd:complexContent>
    </xsd:complexType>
  </xsd:element>
  <xsd:complexType name="IssuerRaw">
    <xsd:complexContent>
      <xsd:restriction base="r:Issuer"/>
    </xsd:complexContent>
  </xsd:complexType>
  <!-- - Service Descriptions-->
  <xsd:element name="copyKeeper" type="cm:StateOnDevice" substitutionGroup="r:licensePart"/>
  <xsd:element name="countKeeper" type="cm:StateOnDevice" substitutionGroup="r:licensePart"/>
  <xsd:element name="intervalKeeper" type="cm:StateOnDevice"
substitutionGroup="r:licensePart"/>
  <xsd:complexType name="StateOnDevice">
    <xsd:complexContent>
      <xsd:extension base="r:LicensePart">
        <xsd:sequence minOccurs="0">
          <xsd:element ref="cm:device"/>
        </xsd:sequence>
        <xsd:attribute name="key" type="xsd:int" use="optional"/>
      </xsd:extension>
    </xsd:complexContent>
  </xsd:complexType>
</xsd:schema>
```

What is claimed is:

1. A method for managing use of protected items within a rights management system having a communication network, at least one receiving device configured to receive usage rights in an original form, the usage rights being based on a set of rights expressions in a syntax, and a consumption device configured to use protected items, the method comprising:

receiving, by the at least one receiving device, a usage right in an original form associated with a protected item, use of the protected item being controlled in accordance with the usage right, the usage right specifying one or more rights expressions;

selecting, by the at least one receiving device, an identifier of a plurality of identifiers based at least in part on a profile of a consumption device, the profile including information identifying a usage rights processing capability of the consumption device;

identifying, by the at least one receiving device, one or more variables associated with the selected identifier;

assigning, by the at least one receiving device, a value to each of the one or more variables based at least in part on information contained in the usage right;

encoding, by the at least one receiving device, the usage right into an encoded usage right, the encoded usage right including the assigned value for each of the one or more variables associated with the selected identifier, the encoded usage right being in an encoded form that can be processed by the consumption device;

transmitting, by the at least one receiving device, the encoded usage right and the protected item to the consumption device; and controlling, by the consumption device, use of the protected item on the specified consumption device in accordance with the encoded usage right.

2. The method of claim 1, wherein the at least one receiving device is a set top box.

3. The method of claim 1, wherein the at least one receiving device is a PC.

4. The method of claim 1, further comprising:

interpreting the usage right; and determining a mapping between the interpreted usage right and the usage rights processing capability of the consumption device.

5. The method of claim 1, further comprising querying a knowledge base to identify the usage rights processing capability of the consumption device.

6. The method of claim 1, further comprising evaluating the usage right in the original form.

7. The method of claim 1, wherein the encoded form is a form that is specific to the consumption device.

8. A system for managing use of protected items within a rights management system having a communication network, the system comprising:

a consumption device comprising:
one or more processors associated with the consumption device; and
one or more memories associated with the consumption device operatively coupled to at least one of the one or more processors associated with the consumption device and having instructions stored thereon that, when executed by at least one of the one or more processors associated with the consumption device, cause at least one of the one or more processors associated with the consumption device to control use of a protected item on the consumption device in accordance with an encoded usage right; and
at least one receiving device comprising:
one or more processors associated with the at least one receiving device; and
one or more memories associated with the at least one receiving device operatively coupled to at least one of the one or more processors associated with the at least one receiving device and having instructions stored thereon that, when executed by at least one of the one or more processors associated with the at least one receiving device, cause at least one of the one or more processors associated with the at least one receiving device to:
enable the receipt of a usage right in an original form associated with the protected item, use of the protected item being controlled in accordance with the usage right, the usage right specifying one or more rights expressions;
select an identifier of a plurality of identifiers based at least in part on a profile of the consumption device, the profile including information identifying a usage rights processing capability of the consumption device;
identify one or more variables associated with the selected identifier;
assign a value to each of the one or more variables based at least in part on information contained in the usage right; and
encode the usage right into the encoded usage right, the encoded usage right including the assigned value for each of the one or more variables associated with the selected identifier, the encoded usage right being in an encoded form that can be processed by the consumption device.

9. The system of claim 8, wherein the at least one receiving device is a set top box.

10. The system of claim 8, wherein the at least one receiving device is a PC.

11. The system of claim 8, wherein at least one of the one or more memories associated with the at least one receiving device has further instructions stored thereon that, when executed by at least one of the one or more processors associated with the at least one receiving device, cause at least one of the one or more processors associated with the at least one receiving device to:
interpret the usage right; and
determine a mapping between the interpreted usage rights and the usage rights processing capability of the consumption device.

12. The system of claim 8, wherein at least one of the one or more memories associated with the at least one receiving device has further instructions stored thereon that, when executed by at least one of the one or more processors associated with the at least one receiving device, cause at least one of the one or more processors associated with the at least one receiving device to query a knowledge base to identify the usage rights processing capability of the consumption device.

13. The system of claim 8, wherein at least one of the one or more memories associated with the at least one receiving device has further instructions stored thereon that, when executed by at least one of the one or more processors associated with the at least one receiving device, cause at least one of the one or more processors associated with the at least one receiving device to evaluate the usage right.

14. The system of claim 8, wherein the encoded form is a form that is specific to the consumption device.

15. At least one non-transitory computer-readable medium storing computer-readable instructions that, when executed by one or more computing devices, cause at least one of the one or more computing devices to:
receive a usage right in an original form associated with a protected item, use of the protected item being controlled in accordance with the usage right, the usage right specifying one or more rights expressions;
select an identifier of a plurality of identifiers based at least in part on a profile of a consumption device, the consumption device being at least one of the one or more computing devices, the profile including information identifying a usage rights processing capability of the consumption device;
identify one or more variables associated with the selected identifier;
assign a value to each of the one or more variables based at least in part on information contained in the usage right;
encode the usage right into an encoded usage right, the encoded usage right including the assigned value for each of the one or more variables associated with the selected identifier, the encoded usage right being in an encoded form that can be processed by the consumption device;
transmit the encoded usage right and the protected item to the consumption device; and
control use of the protected item on the specified consumption device in accordance with the encoded usage right.

16. The at least one non-transitory computer-readable medium of claim 15, wherein at least one of the one or more computing devices is a set top box.

17. The at least one non-transitory computer-readable medium of claim 15, wherein at least one of the one or more computing devices is a PC.

18. The at least one non-transitory computer-readable medium of claim 15, further storing computer-readable instructions that, when executed by one or more computing devices, cause at least one of the one or more computing devices to:
interpret the usage right; and
determine a mapping between the interpreted usage right and the usage rights processing capability of the consumption device.

19. The at least one non-transitory computer-readable medium of claim 15, further storing computer-readable instructions that, when executed by one or more computing devices, cause at least one of the one or more computing devices to query a knowledge base to identify the usage rights processing capability of the consumption device.

20. The at least one non-transitory computer-readable medium of claim 15, further storing computer-readable instructions that, when executed by one or more computing devices, cause at least one of the one or more computing devices to evaluate the usage right in the original form.

21. The at least one non-transitory computer-readable medium of claim 15, wherein the encoded form is a form that is specific to the consumption device.

\* \* \* \* \*